United States Patent
Nagoshi et al.

[11] Patent Number: 6,106,093
[45] Date of Patent: Aug. 22, 2000

[54] INK JET RECORDING APPARATUS CAPABLE OF RECORDING IN DIFFERENT RESOLUTIONS, AND INK JET RECORDING METHOD USING SUCH APPARATUS

[75] Inventors: Shigeyasu Nagoshi, Yokohama; Sadayuki Sugama, Tsukuba; Jiro Moriyama, Kawasaki; Hiroshi Tajika; Noribumi Koitabashi, both of Yokohama; Fumihiro Gotoh, Kawasaki; Masao Kato, Yokohama, all of Japan

[73] Assignee: Canon Kabushiki Kaisha, Tokyo, Japan

[21] Appl. No.: 08/490,718

[22] Filed: Jun. 15, 1995

[30] Foreign Application Priority Data

Jun. 17, 1994 [JP] Japan .................................. 6-135694
Jun. 28, 1994 [JP] Japan .................................. 6-146688

[51] Int. Cl.⁷ ............................ B41J 2/205; B41J 24/38; B41J 2/145
[52] U.S. Cl. .................................. 347/15; 347/9; 347/41; 347/43
[58] Field of Search ................................ 347/15, 9, 41, 347/43, 37, 29; 358/298, 296, 459, 445, 451, 501; 395/118, 123, 510

[56] References Cited

U.S. PATENT DOCUMENTS

| | | |
|---|---|---|
| 4,050,077 | 9/1977 | Yamada et al. . |
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. ............................. 347/86 |
| 4,816,843 | 3/1989 | Sasaki ..................................... 347/86 |
| 4,930,018 | 5/1990 | Chan et al. ............................. 358/298 |
| 5,619,234 | 4/1997 | Nagano et al. .......................... 347/55 |
| 5,633,663 | 5/1997 | Matsubara et al. ........................ 34/41 |

FOREIGN PATENT DOCUMENTS

| | | |
|---|---|---|
| 0517544 | 12/1992 | European Pat. Off. . |
| 0590668 | 4/1994 | European Pat. Off. . |
| 3718775 | 12/1987 | Germany . |
| 54-056847 | 5/1979 | Japan . |
| 54-041329 | 12/1979 | Japan . |
| 59-123670 | 7/1984 | Japan . |
| 59-138461 | 8/1984 | Japan . |
| 60-071260 | 4/1985 | Japan . |
| 63-237669 | 10/1988 | Japan . |
| 2123647 | 2/1984 | United Kingdom . |
| 2169771 | 7/1986 | United Kingdom . |

*Primary Examiner*—Peter S. Wong
*Assistant Examiner*—Rajnikant D. Patel
*Attorney, Agent, or Firm*—Fitzpatrick, Cella, Harper & Scinto

[57] ABSTRACT

This invention is to solve the problem that when images are recorded mixedly in different resolutions, disturbance is brought to images, gaps are created between images, or excessively densified areas appear due to difference in resolutions, that is, changes of dot sizes and recording densities in recording in the area where images are recorded mixedly in high and low resolutions or such images are adjacently present.

In a recording area in which images to be recorded in low and high resolutions are mixed, the recording position of images to be recorded in low resolution is offset relatively with respect to the images to be recorded in high resolution for the intended recording, thus achieving the objectives of this invention.

Also, in the boundary portion where images to be recorded in low and high resolutions are adjacent to each other, supplementary dots are recorded or recorded dots are intermitted in accordance with the present invention. In this way, its objectives are achieved.

52 Claims, 32 Drawing Sheets

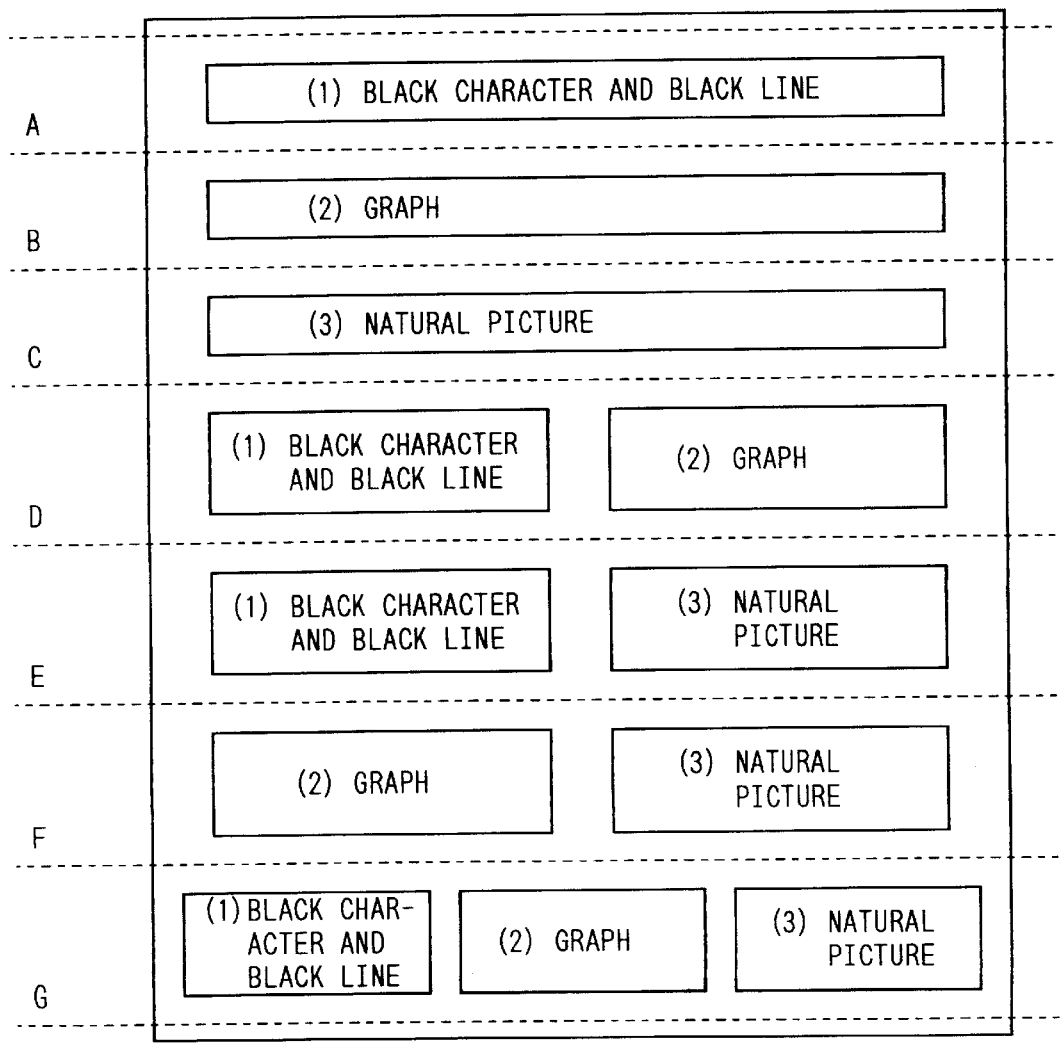

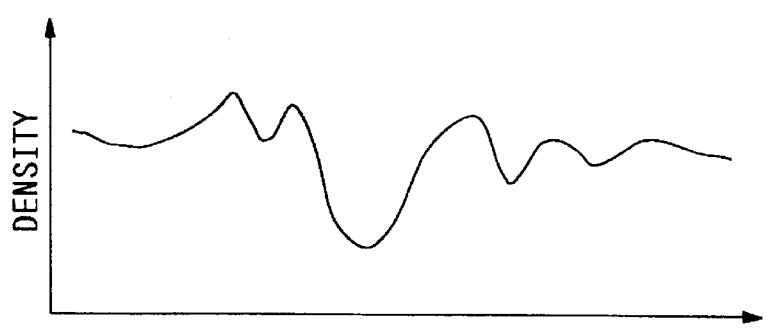
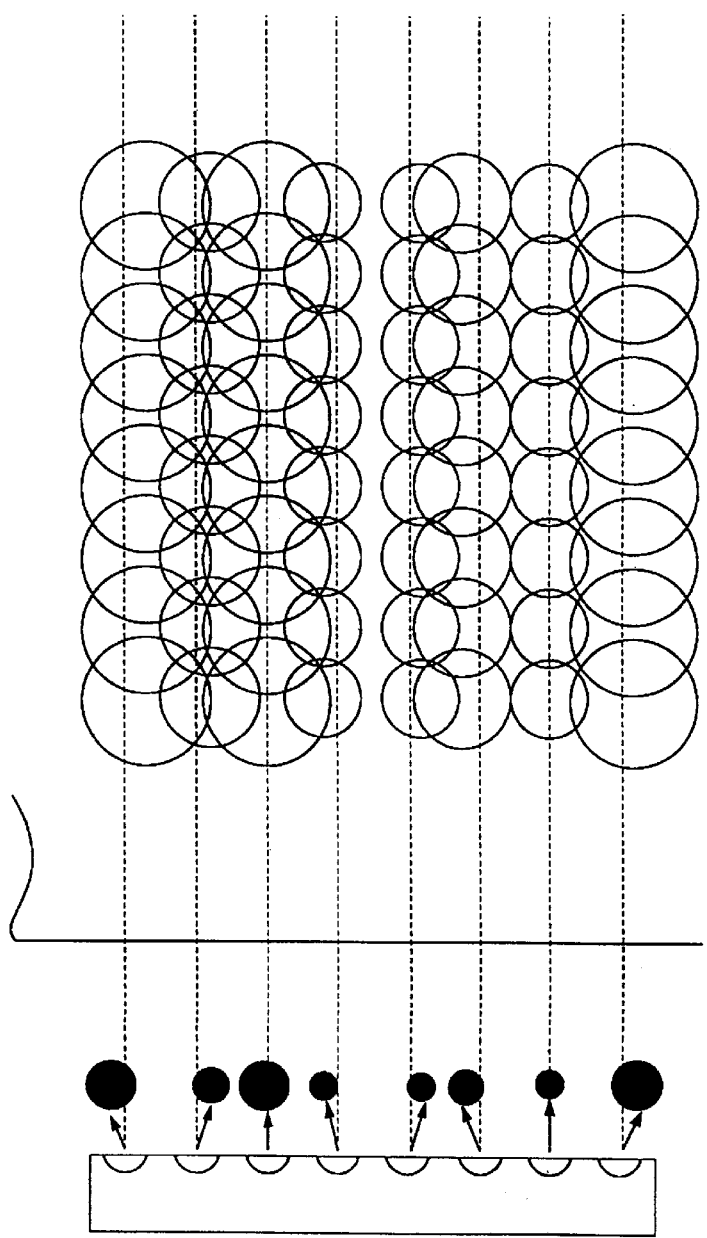

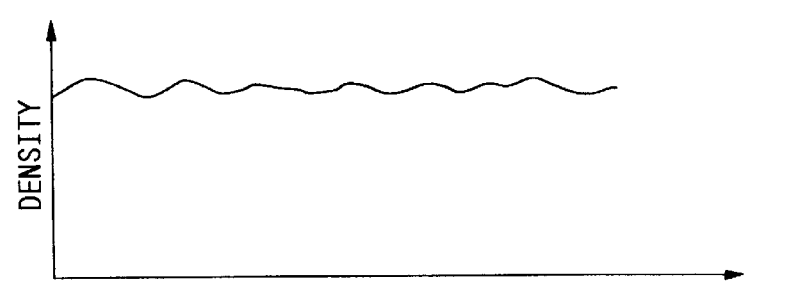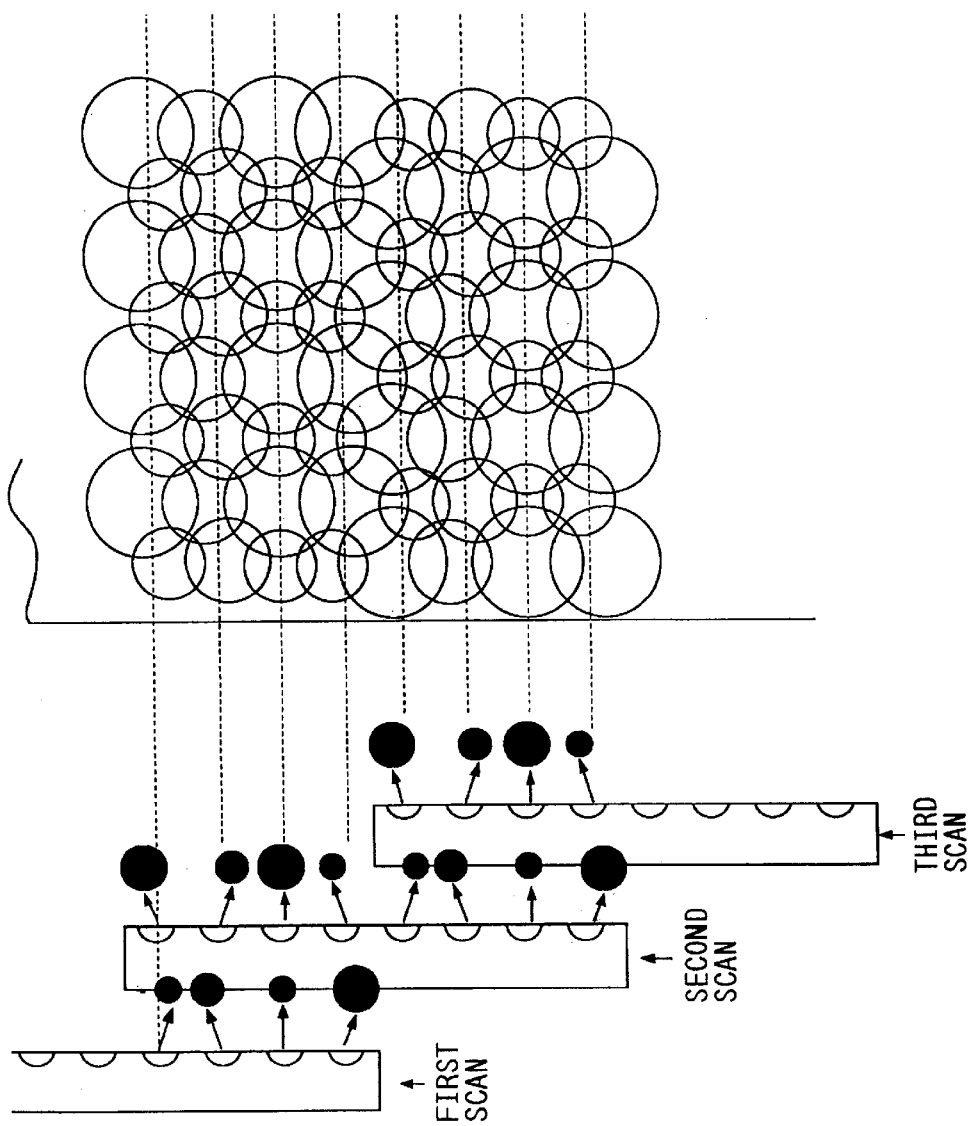

⊘ CROSS PATTERN

◯ COUNTER-CROSS PATTERN

INK JET RECORDING APPARATUS CAPABLE OF RECORDING IN DIFFERENT RESOLUTIONS, AND INK JET RECORDING METHOD USING SUCH APPARATUS

BACKGROUND OF THE INVENTION

1. Field of the Invention

The present invention relates to an ink jet recording method and recording apparatus for forming characters and images on a recording medium by arranging ink droplets to adhere to the medium. Particularly, the invention relates to an ink jet recording method and recording apparatus suitable for performing a recording in high resolution or in high gradation. The recording method and recording apparatus of the present invention are applicable to all the equipment using a plain paper, a specially treated paper, a cloth, an OHP sheet, or the like. As suitable equipment, a printer, a copying machine, and a facsimile apparatus can be named specifically, among others.

2. Related Background Art

In recent years, personal computers, word processors, and other OA equipment are widely used. As a method of outputting on a recording medium the information entered by these kinds of equipment, there have been developed various recording methods, such types as wire-dot, thermal transfer, ink jet recording, for practical use. These recording methods are such that the formation of given images are made by each of the print heads on a recording sheet being fed in, but the kinds of recording heads are remarkably different from each other. Of these, the ink jet recording makes lesser noises, while making it possible to record in a higher quality and resolution, because there is no need for this type to be in contact with any recording media directly. In recent years, therefore, more attention has been given increasingly to this type of recording.

For a print head of an ink jet recording type, there is known a structure in which electrothermal transducing elements are arranged respectively for a sheet or each path of ink (nozzles) in which ink is retained. With this structure, driving signals are applied to the electrothermal transducing elements in accordance with recording information to cause them to generate the thermal energy that gives to ink surrounding them a rapid rise of temperature beyond nuclear boiling; hence creating film boiling on the thermoactive surface in each of nozzles of the print head. Then, an air bubble is formed in ink in the nozzle one to one by the corresponding driving signals thus provided. If the driving signals are provided in the form of pulses, the development and contraction of air bubbles are effectuated instantaneously. With this arrangement, therefore, it is possible to achieve the provision of a particularly quick response for the intended ink discharging.

As another structure of ink jet recording type, there is known a method in which electromechanical transducing elements (referred to as heaters) are arranged in or around each of ink paths, and then, a voltage is applied to each of the heaters in accordance with recording information. In this way, the mechanical pressure is exerted by the respective heaters to cause ink droplets to fly for the formation of images. Here, piezoelectric elements are known widely as the electromechanical transducing elements serving as means for generating discharging energy.

In this respect, as an invention that provides highly precise images by use of ink jet recording, a structure is disclosed in Japanese Patent Publication No. 54-41329. According to the structure disclosed in this publication, images (characters) formed at different dot pitches (resolutions) are recorded by dots of different sizes, large or small.

However, it is preferable to make the diameter of the printing dots small to form a unit pixel for the provision of high resolution to obtain high-quality images. This is because the unit pixel becomes smaller to form an image in this case, also because it is necessary to provide more printing dots if the resolution should be made higher on one and the same region in a recording area. For example, when a recording is performed in resolution of 360 dpi (dots per inch), a printing is executed by dots of 360×360 in a recording area of one square inch. However, should the printing be made in high resolution, such as in a density of 720×360 (dpi) or 720×720 (dpi), the number of recording dots is made larger by two or four times per unit area, respectively. In a usual recording, the driving frequency of a print head is set in a range where the performance of such recording is possible without generating any unstable discharges. Compared to a recording in usual resolution, high resolution recording requires dot numbers two to four times. Therefore, in order to execute high resolution recording without reducing the recording speed, it is necessary to increase the driving frequency of the print head two to four times. However, if the driving frequency is made higher than the expected capability of a print head, it may invite the generation of unstable discharges or an abnormal increase of temperature of a print head, which uses electrothermal transducing elements. As a result, the printing quality is lowered extremely. Therefore, it is impossible to increase the driving frequency higher than the expected capability of the recording head. This inevitably brings about a drawback that the printing should be made slower.

Also, in high resolution printing, the printing dot numbers becoming great, more energy should be applied to the printing head. The discharging energy at the time of ink discharge does not mean the total dissipation of the energy that has been given to discharging ink. Particularly when a type is adopted to discharge ink by the application of thermal energy using the electrothermal transducing elements described earlier, the residual energy is accumulated in the vicinity of the ink discharge ports of a print head. This excessive thermal energy causes the temperature of the printing head to rise after all. Meanwhile, the physical properties of ink used for recording, such as ink viscosity, are dependent on heat, and are directly related to the amount of the ink to be discharged. Therefore, the accumulation of the excessive heat on the print head produces adverse effects on controlling the discharging amount of ink; hence resulting in a drawback that the images are not recorded uniformly.

Also, when ink droplets of different sizes are discharged from one and the same nozzle, disturbance takes place in the stability of an intended discharge if the ink droplets of different sizes are being discharged mixedly in one and the same scan. This disturbance is caused by the fact that the ink jet type is provided with electrothermal transducing elements or the like for discharging ink in each of the ink paths, and that when ink droplets of different sizes are discharged, the ink flowing in and out of each ink path becomes uneven to hinder the stable ink discharging.

Also, whereas the life of a print head is essentially regulated by the number of ink discharging, the number of dots to be arranged in one and the same area is increased far more than the number required for low resolution printing when effectuating a highly densified printing; thus making the number of sheets recordable by one print head smaller when executing the highly densified printing. Therefore, in carrying on high density printing, the life of the print head tends to become shorter as compared to printing in low resolution. Then print heads should be replaced more frequently, which inevitably results in increased running costs.

As the best mode embodying the present invention, it is possible to record in a plurality of different resolutions in dot diameters of different sizes depending on recording media to be used. In this mode, however, lattice points tend to be offset by different resolutions, and there are some cases where even slight offset of dots becomes easily noticeable on a recorded image if the printing is made without any adjustment.

Also, in order to enhance the printing density, a double impacting mode is adopted so that the same dot is printed twice on one and the same position. In this mode, however, a portion recorded in high density is degraded by blurred ink in some cases if ink droplets of the same size are placed for recording in one and the same position.

Also, in the conventional art, it is found that no study has been made as to the status of resolutions switched over from one to another or the status of the kinds of images (dot sizes, for example) which are changed when recording is executed by use of dots of different sizes in different resolutions.

The present inventors have studied the situations brought by changes of resolutions and kinds of images, and found problems anew. In other words, by changes in dot sizes, that is, changes of one resolution to another, there occurs a problem that when high and low resolution recording areas are relatively close to each other, a portion where images are missing or an excessively densified portion is locally created in an ink image. Such portion is also created by the image itself that has been changed into being in high resolution.

Here is a specific example. Generally, along the adoption of high resolution intended in anticipation of obtaining a high-quality image, the unit picture element (unit pixel) that forms an image becomes smaller. Therefore, it is desirable to make the diameter of printing dots smaller in forming a unit pixel. This is because, unlike an electronic photography or a system that uses solid ink, the ink jet type that uses liquid ink requires reduction of the amount of ink adhering to a recording medium in order to avoid any excessive deposition of ink; hence preventing degradation of image quality on a recording medium, and also, deformation of the recording medium itself (that is, preventing it from presenting a waving condition called cockling) due to the excessive deposition of ink on it.

As described above, when dots are positioned on the lattice points arranged respectively in accordance with a plurality of different resolutions, the lattice points (the center points of arranged dots) are offset by each of the different resolutions applied, thus causing the arranged dots to be shifted. This situation is shown in FIG. 35. FIG. 35 illustrates an image formed by ink droplets discharged from a discharge port 23 by each of the scans 1 to 6 by the recording head 102. As clear from the relative positions of the recording head 102, which are designated by numerals 1 to 6 with respect to the recorded image, the recording medium and recording head are allowed to scan correlatively per scanning. In FIG. 35, the recording is performed with large dots at first in comparatively low resolution, and on the way, the recording is switched over to the one being carried out with small dots in high resolution. As clear from FIG. 35, the portion where an image is essentially missing occurs in an ink image as a gap A resulting from the dot shifting on the boundaries between each of areas in which large and small dots are arranged. In the gap A, there are changes in the resolution and size of dots to be recorded, which clearly indicates that the printing modes have been changed. In FIG. 35, white portions appear in the lattices as white streaks.

Also, in FIGS. 36A and 36B, an example is shown, in which different kinds of images (here, large dots and small dots) are mixedly present in one and the same luster. FIG. 36A illustrates the sizes and positions of recorded dots, while FIG. 36B represents the dots being plastered in order to make the recording result easily observable. It is understandable from FIGS. 36A and 36B that the gap B occurs in the junction between the large and small dots due to the displacement of lattice points in the dot arrangement. Also, it is observable that there partly appears the area C where the density is enhanced although extremely locally.

Now, as described above, a drawback is encountered in this respect that the uniformity of recorded image is disturbed when printing modes, such as resolutions, are changed according to the kinds of image to be recorded.

Further, for the enhancement of printing density, a double impacting mode is applicable. In this mode, dots are impacted twice on one and the same portion, but this mode also creates a problem following the changes of resolutions. With this mode, it is possible to attain the enhancement of density, but particularly when recording is performed in high resolution, the blurred ink may affect the portion that has been recorded in low resolution in some cases, and the image quality is degraded eventually.

SUMMARY OF THE INVENTION

The present invention is designed in consideration of the problems described above. It is an object of the invention to prevent the occurrence of disturbance in order to obtain recorded images in a good condition even when the images are formed mixedly in different resolutions.

Also, it is an object of the present invention to form images both in low and high resolutions without the provision of any specially arranged recording head, and to prevent the recording head from making its life shorter by the increased dot numbers required to record images in high resolution.

In accordance with the present invention, an ink jet recording apparatus for forming images by discharging ink comprises means for controlling the amount of ink droplets discharged from the recording head; means for controlling the density of dots to be recorded; means for controlling recording to form images in a comparatively low density by the ink droplets having a comparatively large amount of discharge, and to form images in a comparatively high density by ink droplets having a comparatively small amount of discharge; and control means for controlling the recording positions of each image when mixing comparatively low density images and comparatively high density images on a recording area.

Also, in order to achieve the object described above, the present invention is characterized in that a high speed recording is materialized by separating the portion requiring high resolution recording from the portion that does not require any high resolution recording by switching the printing modes using different sizes of recording dots in accordance with the kinds of images to be recorded.

Also, it is an object of the present invention to provide an ink jet recording method for forming ink images in different resolutions on a recording medium by use of discharge means for discharging ink, which is characterized by comprising a step of improving the image quality, in which the image quality of an image missing area or a density enhanced area of an ink image created following the changes of different resolutions is improved by changing the recording conditions of the ink image to be printed, and also, to provide an ink jet recording apparatus comprising means for determining the image missing area or density enhanced area of an ink image created following the changes of different resolutions, and means for improving image quality for improving the image quality by changing the recording conditions of the ink image to be printed in the area thus determined.

Also, in order to achieve the object described above, an ink jet recording method of the present invention for forming images of different resolutions on a recording medium by use of discharge means for discharging ink is characterized in that such method comprises a step of determining the recording area for which resolutions are to be changed, a step of correcting the image data on the boundary portions between different resolutions of the recording area for which the resolutions are to be changed, and a step of performing recording in accordance with the data thus corrected.

Further, in accordance with the present invention, it is possible to provide an ink jet recording method for forming ink images of different resolutions on a recording medium by use of discharging means for discharging ink, in which a printing mode is adopted to superpose the arrangement of ink droplets by dividing them several numbers on one and the same pixel position of a representation in a first resolution, and to change the recording image data at the time of recording in the first resolution to the data having a second resolution that is higher than the first resolution so that the amount of ink droplets arranged per unit pixel becomes greater than that of those arranged at the time of recording in the first resolution, and then, to execute a smoothing treatment for the formation of images without any superposed arrangement of ink droplets on one and the same position per unit pixel on the representation in the second resolution. With this method, it is possible to achieve the formation of high quality images without creating any image defects.

In accordance with the present invention, it is possible to provide an ink jet recording method for forming ink images, in which a printing mode is adopted to superpose the arrangement of ink droplets by dividing them several numbers on one and the same pixel position where the ink droplets of a first size are arranged, and to change the recording image data for use of recording by the ink droplets of the first size to the data for use of recording by the ink droplets of a second size that is smaller than the first size of the ink droplets so that the amount of ink droplets arranged per unit pixel becomes greater than that of those arranged at the time of recording by the ink droplets of the first size, and then, to execute a smoothing treatment for the formation of images without any superposed arrangement of ink droplets on one and the same position per unit pixel where the ink droplets of the second size are arranged. With this method, it is also possible to achieve the formation of higher quality images without creating any image defects.

In short, with the present invention, it is possible to make the image degradation smaller in the location where printing modes are to change for the application of different dot arrangements depending on the printing modes that are to vary following the changes of recording dot sizes or resolutions of recording images. Also, the recording data in low resolution portions are changed into high resolution recording data, and then, the recording data after such change are given a smoothing treatment for printing without executing any intermittent processing for use of low resolution data. In this way, ink droplets can be arranged in sufficiently high density with more concentration; hence making it possible to solve all the problems encountered anew.

BRIEF DESCRIPTION OF THE DRAWINGS

FIG. 17 is a view which shows the combination of each kind of image to be recorded.

FIGS. 18A to 18C, FIGS. 19A to 19C, FIGS. 20A to 20C and FIGS. 21A to 21C are views which illustrate a multipass printing method.

DETAILED DESCRIPTION OF THE PREFERRED EMBODIMENTS

Hereinafter, with reference to the accompanying drawings, the detailed description will be made of the embodiments in accordance with the present invention.

First Embodiment

Figure 7:
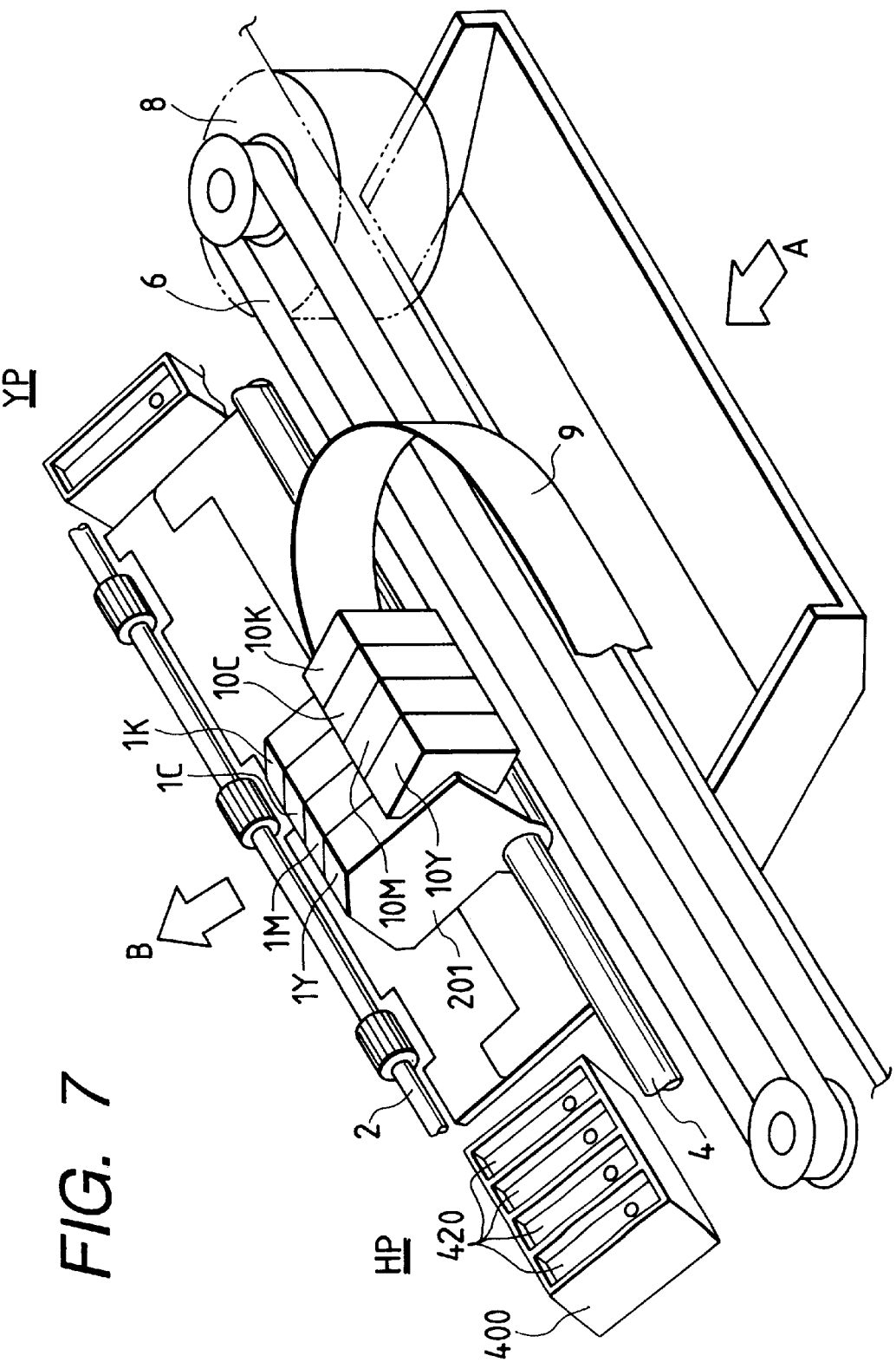
FIG. 7 is a view showing an ink jet recording apparatus to which the present invention is applicable.

FIG. 7 shows one example of a serial type ink jet color printer to which the present invention is applicable.

A print head 1 is a device provided with a plurality of nozzle arrangements to discharge ink droplets for the formation of dots on a recording medium to execute an image recording. In the present embodiment, piezoelectric elements, that is, electromechanical transducers, are used to positively create ink droplets of different diametral sizes (namely, the different amounts of ink discharging). It is possible to discharge ink from one and the same nozzle in different discharging amounts by controlling the voltage value or pulse width, which are applicable to each of the piezoelectric elements. Also, from each of the different print heads, ink of different color is discharged, respectively. A color image is formed on a recording medium by mixing these ink droplets of different colors. Print head arrays 1K (black), 1C (cyan), 1M (magenta), and 1Y (yellow) are mounted on a carriage 201. An image is formed on a recording medium in that order while one scanning is performed in one direction.

Figure 6A:
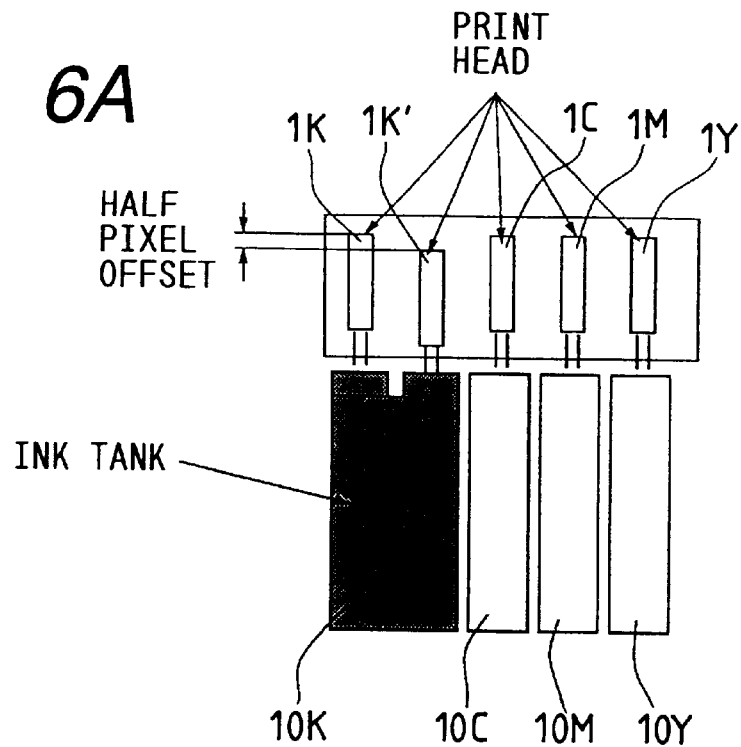
FIG. 6A is a view showing the structure of a print head in which its black head is arranged with half pixel offset.
Figure 6B:
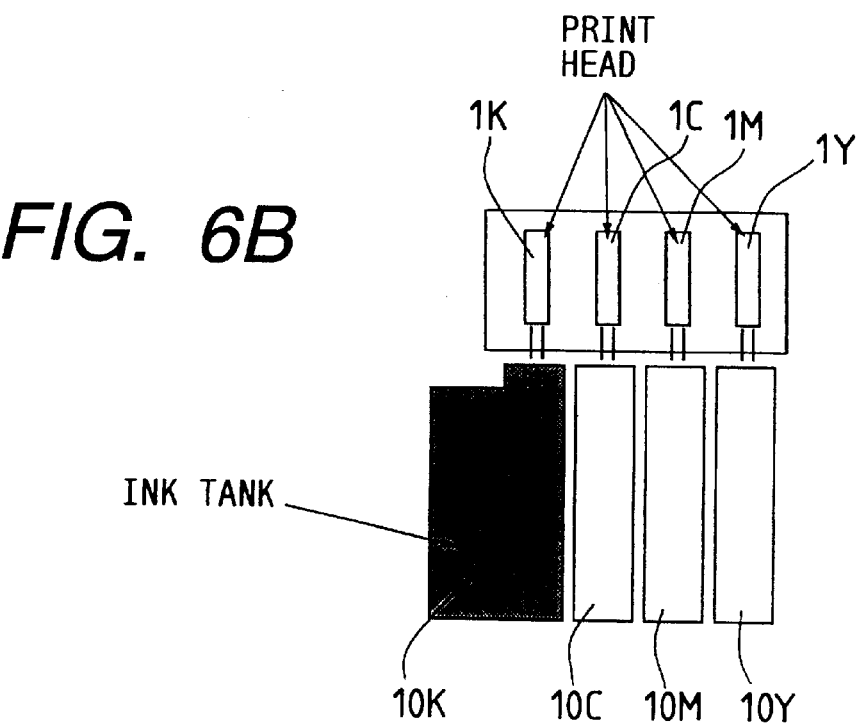
FIG. 6B is a view which shows a conventional print head.

FIG. 6B is a view which shows the structure of print head arrays for the respective colors, and ink tanks. For example, when a red image (hereinafter referred to as R) is formed, ink droplets in magenta (hereinafter referred to as M) are impacted at first on a recording medium. Then, on the recorded dots M, yellow (hereinafter referred to as Y) is impacted to mix colors so that these dots look like dots in red. Likewise, if an image is to be formed in green (hereinafter referred to as G), ink droplets are impacted in order of C (cyan), and Y. If an image is to be formed in blue (hereinafter referred to as B), ink droplets are impacted in order of C and M. In this way, the color images are formed, respectively.

The carriage 201 travels on the sliding shaft when driving force is transmitted from a driving motor 8 through belts 6 and 7. A recovery unit 400 is provided with a function to keep the print head in a good condition. When the print head is not engaged in printing, the cap arrays 420 close the discharge surface thereof in order to prevent it from being dried. The position of the carriage 201 where it faces the recovery unit 400 for this purpose is called home position (hereinafter referred to as HP). Usually, a printing operation is actuated by allowing the carriage to travel from the HP. In the present embodiment, therefore, the printing is performed from left to right in FIG. 7. Feeding in the sub-scanning direction is such that a recording medium is fed by a sheet feeding motor (not shown) in the feeding direction, that is, direction A in FIG. 7. Here, a reference numeral 9 designates a flexible cable through which electric signals are supplied to the recording head. Also, ink is supplied from each of the ink cassettes 10K, 10C, 10M, and 10Y mounted on the carriage 201. The ink supply is not necessarily limited to the structure shown in FIG. 6A. It may be possible to arrange a structure so that tube arrays are arranged to supply ink like the flexible cable, and then, ink of each color is supplied to each print head mounted on the carriage.

Figure 5:
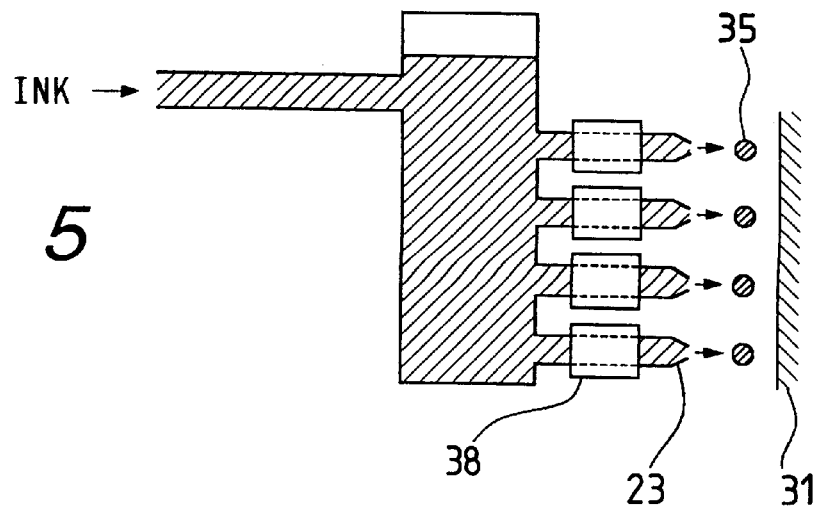
FIG. 5 is a view which shows the details of a recording head which uses piezoelectric elements as discharging means.

FIG. 5 is a view showing in detail the recording head represented in FIGS. 6A and 6B. For its structure, a recording head using electromechanical transducers is adopted as disclosed in Japanese Patent Laid-Open Application No. 63-237669, for example. It is possible to obtain ink droplets in different volumes by changing the driving conditions of piezoelectric elements by use of the piezoelectric elements 38 serving as the electromechanical transducers. Here, the driving conditions are meant to control voltage values, that is, the driving energy, and driving time, or to control driving waveforms in some cases.

Figure 23:
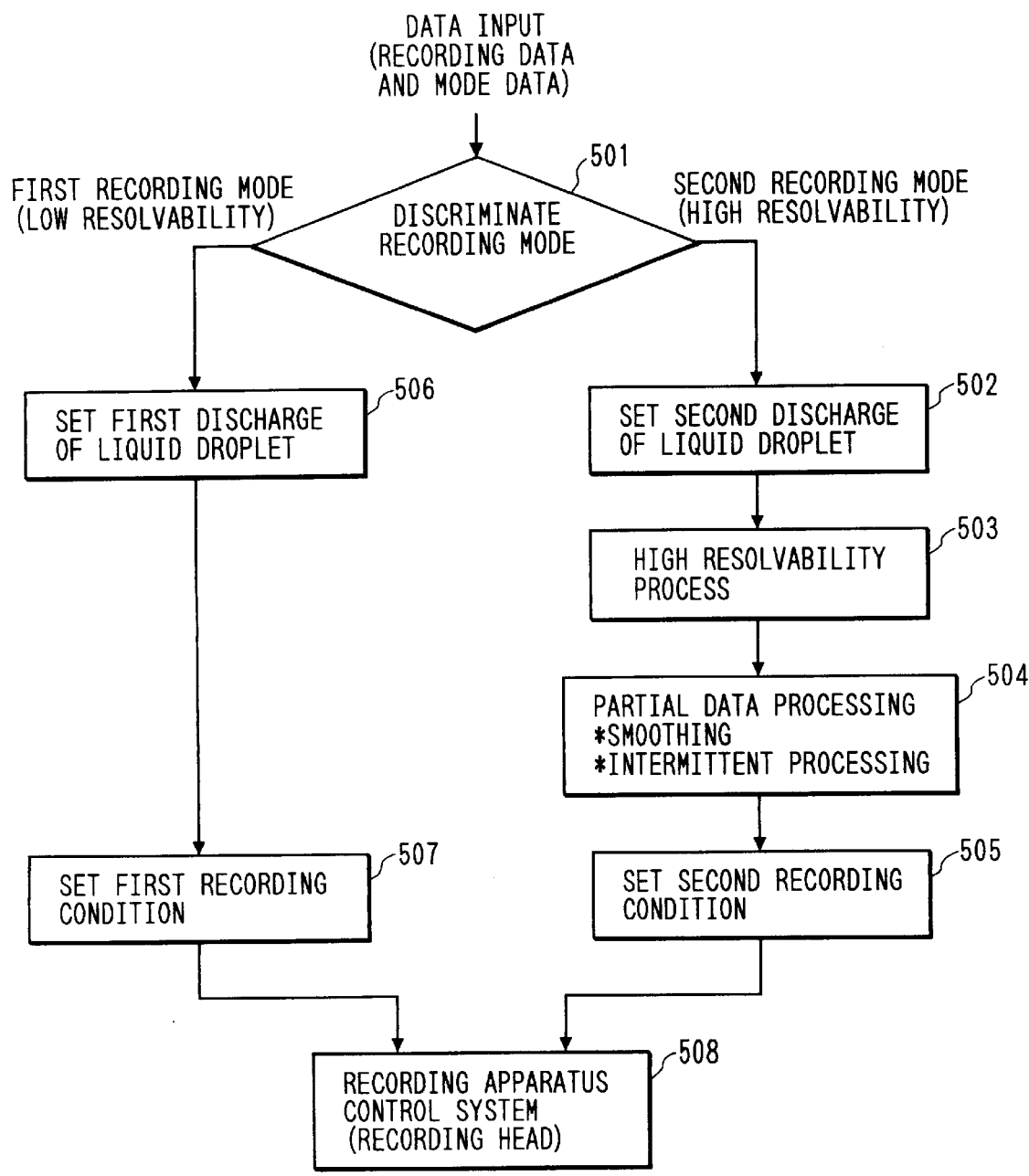
FIG. 23 is a block diagram illustrating the function of an apparatus in accordance with the present invention.

FIG. 23 is a block diagram which shows the functions of a recording apparatus in accordance with the present embodiment. With recording data, print mode data, or the like, being received as data whereby to determine a recording mode, the recording apparatus determines a recording mode to be executed by use of means 501 for determining recording modes. The kinds of images to be recorded and some others constitute criteria for a recording mode to be determined. In other words, a recording mode is determined on the following, among others:

1. Whether or not the recording data are characters.
2. Whether the recording data are monochromic or color.
3. Whether the recording data are in low resolution or high resolution.
4. Which one of recording media is selected.
5. Whether or not the recording data are prepared as a bit image (only bit image data are printed in high resolution).

Now, assuming that a second recording mode, that is, high density printing mode, has been selected, condition and other items for the print head to be driven by "the second droplet discharge setting 502" is defined (in this case, the driving conditions are those defined for discharging small dots). Then, in "the high resolution processing 503", a process is executed, among others, to change the data provided for a usual printing density into the recording data corresponding to a recording in high resolution. Continuously, in "the partial data processing 504", a process is executed, among others, to create small dot data in a position that has not existed in the low-resolution data. Then, in "the second recording data setting 505", the particulars of printing mode condition are determined. In other words, the feeding amount of a recording medium, traveling speed of the carriage, and the number of printing paths are determined among others. The "control system 508 of the recording apparatus" receives these pieces of information to drive the print head actually or control the driving of the feed motor for the recording medium and others. For these controls, it is set to make the recording modes changeable per carriage scan by developing the data for the print head on several lines so as to provide the apparatus with information to cover several scanning portions in advance. Also, the aforesaid criteria for determining recording modes are made changeable in accordance with the objectives of the image output. As an example, it is not necessarily confined to high resolution recording even if the objectives are to print characters or black images, and it may be possible to set the high resolution recording mode for the printing data other than characters or black images if the setting should be made to place more importance on recording in colors. Also, it is included in the present embodiment that a structure is arranged to enable a recording mode to be set manually, and then, the required determination is executed by the application of the determining means 501.

Of a series of processing steps described above, a part or the entire steps up to those executed by the control system of a recording apparatus can be executed by use of an apparatus capable of transmitting and receiving data to and from the recording apparatus, such as a host computer, not necessarily by the recording apparatus main body.

Also, it may be possible to arrange each of the blocks represented in FIG. 23 as one processing step to execute a series of processes from the determination of a recording mode to the execution of recording in the mode thus determined, although the description has been made of each means for carrying out the respective functions separately.

Now, the description will be made of a multipass printing, which makes it possible to reduce unevenness in the density of print to be made by a recording head.

<Multipass recording method (fine recording method)>

For image printing, it is necessary to take various factors into account. These are coloring, graduation, and evenness, among others. Particularly, as to evenness, a slight displacement of nozzle unit, which may take place in the manufacturing steps of print heads, produces adverse effects on the discharging amount and direction of ink from each nozzle in printing, and brings about density unevenness in the printed images ultimately. This causes the degradation of image quality.

Figure 18C:
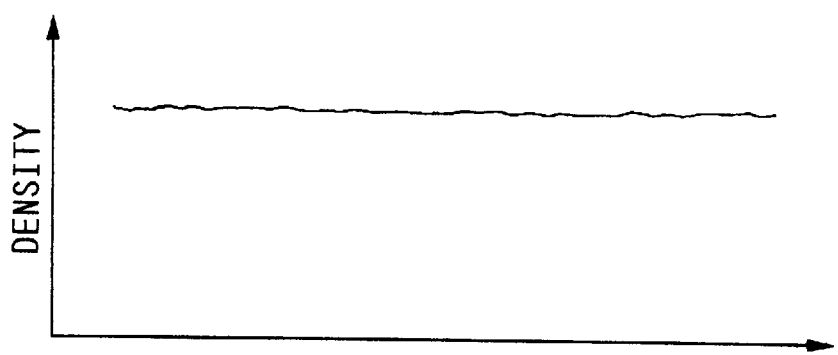
Figure 18B:
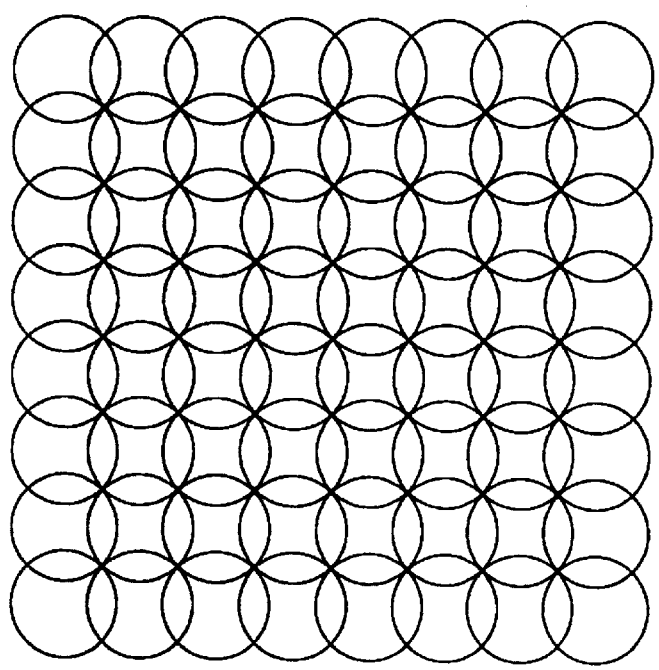
Figure 18A:
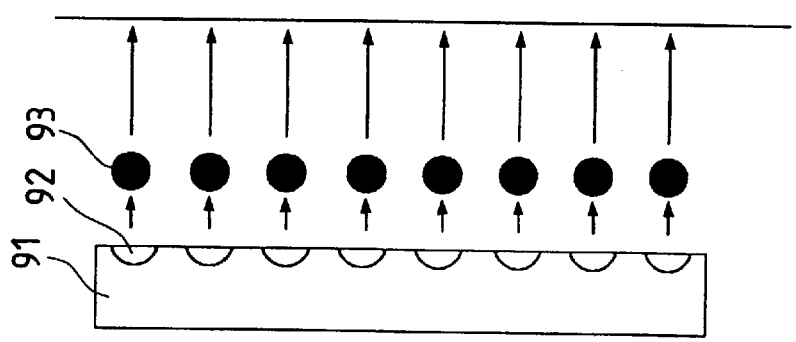

Now, in conjunction with FIGS. 18A to 18C and FIGS. 19A to 19C, the description will be made of density unevenness being created by a print head. Here, to simplify the explanation, a monochromatic print head is used for example. FIGS. 18A to 18C show an example assumed to be printed by a recording head the nozzle unit of which is not displaced. The discharging amount and direction, and other characteristics of this head are not assumed to be uneven, either. In FIG. 18A, a reference numeral 91 designates a print head, which is structured by only eight nozzles for simplification; 93, ink droplets discharged from multinozzles 92, respectively. It is ideal that ink should be discharged in a constant discharging amount and direction as shown in FIG. 18A. If discharges are executed like this all the time, dots of even size should be impacted on a sheet as shown in FIG. 18B. FIG. 18C relatively illustrates the density of recorded image produced by each of the recording dots. As clear from FIG. 18C, it is possible to obtain an image having no unevenness in density as a whole.

In practice, however, nozzles differ from each other as described earlier. If a printing is made as above without any adjustment, unevenness should occur as shown in FIG. 19A in the sizes and directions of ink droplets discharged from each of the nozzles. These droplets are impacted on the recording sheet as shown in FIG. 19B. FIG. 19B illustrates a state that white streaks are created on plain sheet portions (the portions yet to be printed). Here, its area factor is not satisfied 100% because ink is not impacted in the main scanning direction of the head or dots are superposed more than necessary to create black streaks in the portions: here, printing density becomes extremely high on the contrary. The aggregation of dots thus impacted presents the distribution of densities as shown in FIG. 19C with respect to the direction in which the nozzles are arranged. As a result, these phenomena are usually sensed as density unevenness when observed by eye-sight. Also, there is a case where streaks become conspicuous due to an uneven amount of sheet feeding. Now, in conjunction with FIGS. 20A to 20C and FIGS. 21A to 21C, a method will be described briefly. According to this method, the print head 91 is arranged to scan three times for a complete printing of the recording area shown in FIGS. 18A to 18C and FIGS. 19A to 19C. Here, the area of four-unit pixel, which is a half of the recording width of the recording head, is covered completely by a consecutive two-time pass. In this case, the eight nozzles of the print head are divided into two groups, upper four nozzles and lower four nozzles. The dots printed by one nozzle per scan are those of a regulated image data, which is intermitted approximately by half according to a certain arrangement specifically made. Then, after sheet feeding at the second time scan, dots are made by use of nozzles different from the first scanning to fill in the remaining image data that have not been recorded by the first scan; hence complementing the recording to completely print the area of four-unit pixel. The method described above is called fine recording method. With this method, it is possible to reduce the influence that may be exerted on a printed image by the peculiar characteristics attached to each nozzle, because one and the same area is printed by plural nozzles for the formation of an image even when using a head having uneven discharging characteristics like a print head shown in FIGS. 19A to 19C. Therefore, the printed image appears like the one shown in FIG. 20B where the black and white streaks are not so conspicuous as appearing in FIG. 19B. The density unevenness that appears on the recorded image is also considerably reduced as shown in FIG. 20C compared to the example shown in FIGS. 19A to 19C.

Figure 21A:
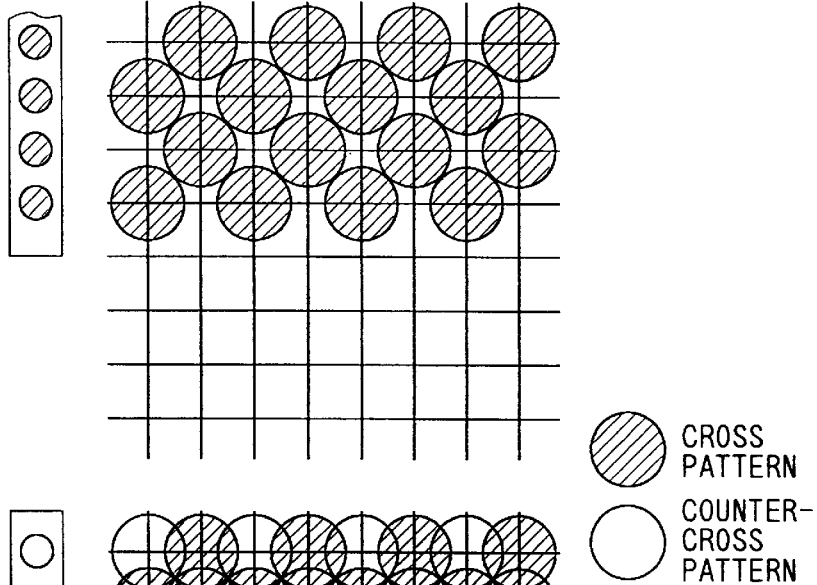
Figure 21B:
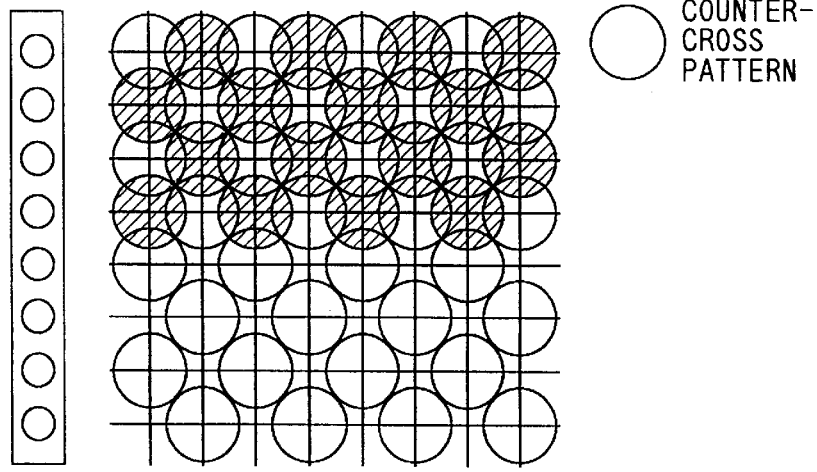
Figure 21C:
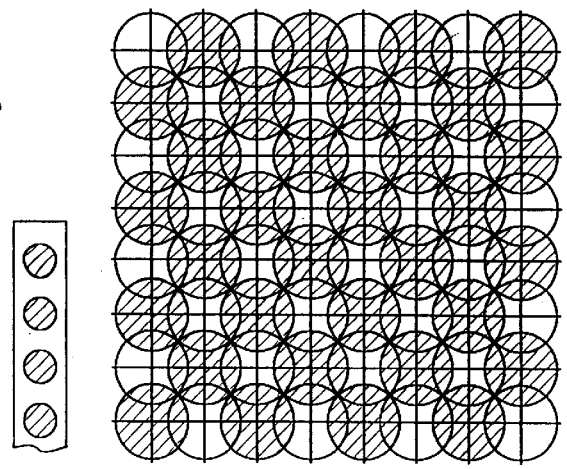

When a fine recording is executed as described above, an image data is divided into those for the first scan and second scan so that the divided ones can complement each other in accordance with a certain specific arrangement, but usually, this arrangement (intermitted patterns) uses the patterns shown in FIGS. 21A to 21C, which present cross-lattices just by each of the horizontal and vertical pixels in most cases generally. Therefore, in a unit printing area (here, four-unit pixel), recording is completed by a first scan to print cross lattices, and a second scan to print counter-cross lattices. FIG. 21A, FIG. 21B, and FIG. 21C illustrate the processes in which one specific area is completely printed by use of the cross and counter-cross patterns, respectively. The example shown in FIGS. 21A to 21C are made by use of a print head having eight nozzles as in the examples shown in FIGS. 18A to 18C and FIGS. 19A to 19C. At first, in the first scan, the cross patterns are recorded by use of the lower four nozzles as shown in FIG. 21A. Then, in the second scan, the sheet is fed by a portion of four pixels (½ of the width of entire nozzles) as shown in FIG. 21B. After that, the counter-cross patterns are printed. Further, in the third scan, the sheet is again fed by a portion of four pixels (½ of the width of entire nozzles) as shown in FIG. 21C. The cross-patterns are again recorded. In this way, the sheet is fed by a portion of four-unit pixel, and cross and counter-cross patterns are recorded alternately to complete the recording area of four-unit pixel per scan. As described above, one and the same area is printed by two kinds of nozzles to make it possible to obtain a high-quality image where the density unevenness has been reduced. Also, depending on objectives, it may be possible to use mask patterns other than the cross and counter-cross patterns for materializing various intermittent arrangements. Also, it may be possible to scan three or four times, for example, to completely print a recording area, while using the complementary patterns, instead of the two-time scan as described above.

Now, the description will be made of image formation in accordance with the present embodiment of the invention.

In the present embodiment, the image formation is performed by switching two printing modes. One is a high speed printing mode used for printing in a usual pixel density (hereinafter referred to as a high speed printing because the printing is possible at high speeds as compared to high density recording). The other is high density printing mode used for printing in high resolution. Also, the high speed printing mode is performed in lower resolution as compared to the high resolution printing. Therefore, the high speed printing mode is also referred to as low resolution mode.

<High speed printing mode>

At first, the high speed printing mode will be described in accordance with the present embodiment.

Figure 8:
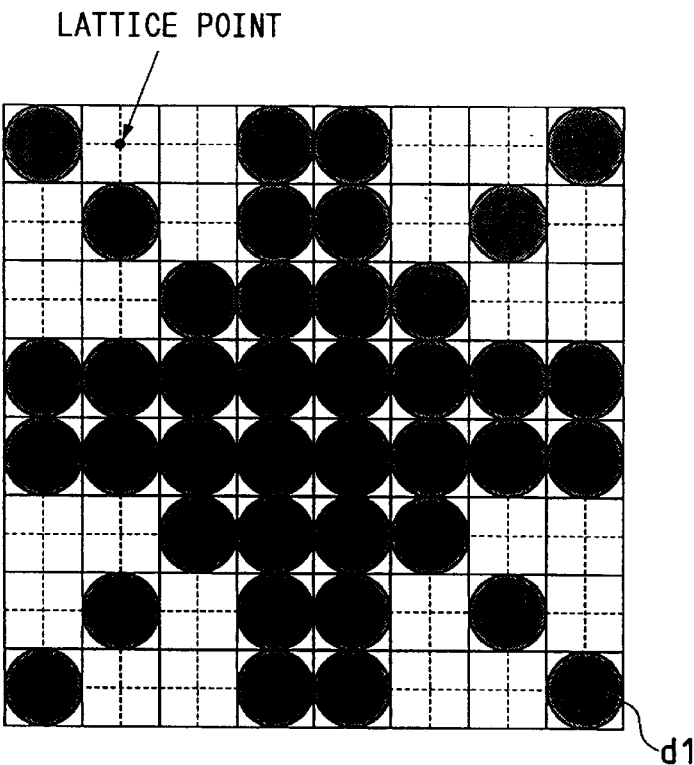
FIG. 8 is a view which shows the dot arrangement resulting from a high speed (low resolution) recording.
Figure 14:
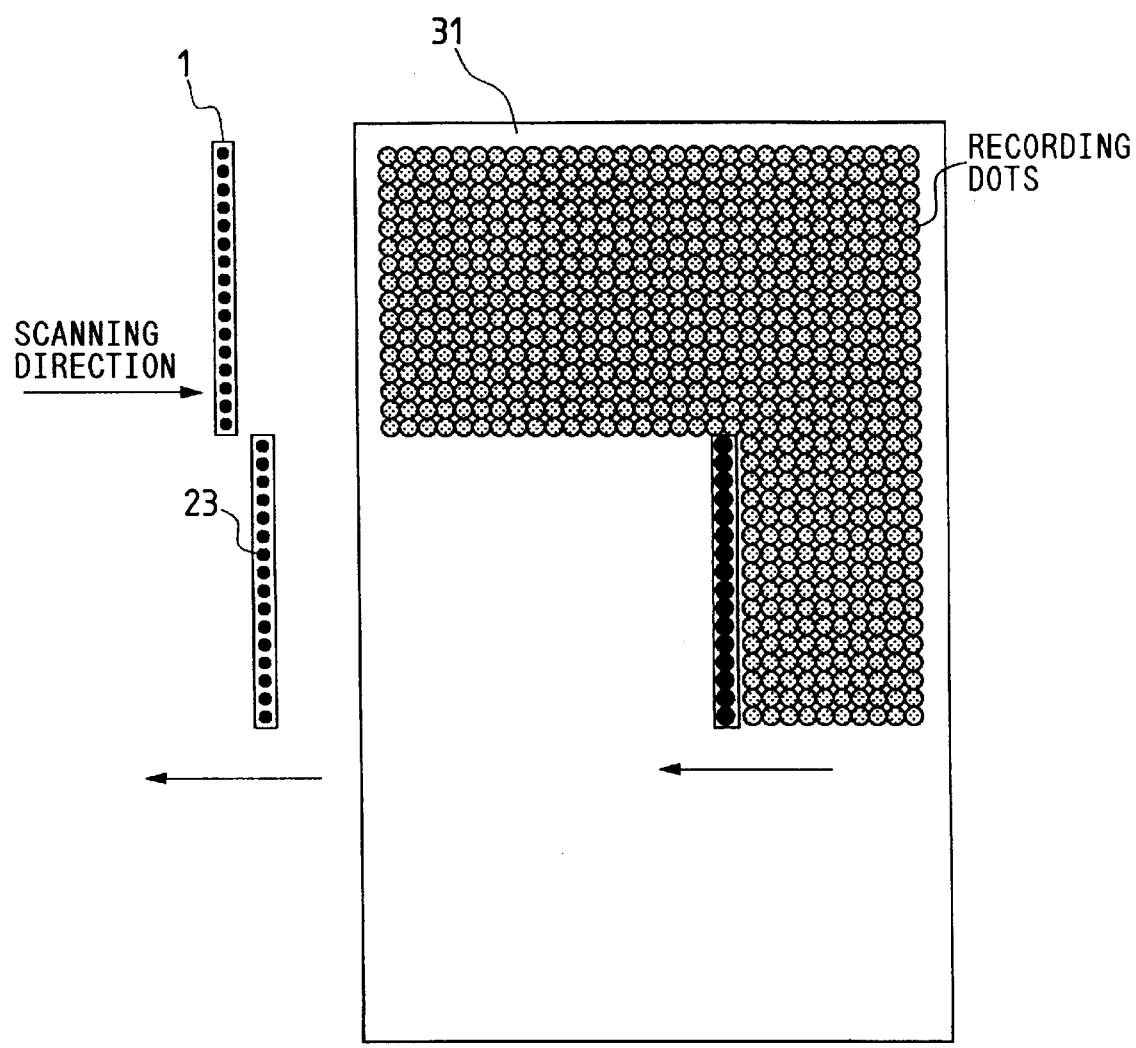
FIG. 14 is a view which shows recording in forming an image by one scan used for a bidirectional printing.

The high speed printing mode of the present embodiment is to perform printing within one scanning by use of all the discharge nozzles of a print head (hereinafter referred to as one-pass printing). FIG. 14 shows an example of one-pass bidirectional recording. A recording is made in the reciprocal movement of a carriage. The recording is executed by the respective scans without any intermittent arrangement. In accordance with the present embodiment, a print head 1 is provided with 16 discharge ports 23. In the high speed printing mode of the present embodiment, the mode is defined to print images in low resolution. The recording density is set at 360 dpi both for vertical and horizontal dots (main and subscans). In the present embodiment, the pitches between ink discharge ports of the print head are those equivalent to printing in low resolution. The recording density being low, a larger diameter is suitably applicable to ink droplets per unit pixel as compared to high resolution printing. In the present embodiment, although depending on ink properties, the cubic ratio of discharging ink droplets is almost 2:1 between those dots (large ink droplets) discharged to record in low resolution and those comparatively smaller dots (small ink droplets) discharged to record in high resolution. In the present embodiment, the discharging amount of large ink droplets is assumed to be approximately 80 pl, while that of the small ink droplets, approximately 40 pl. FIG. 8 illustrates in detail the dot arrangement of a low resolution image recorded by the aforesaid one-pass printing. In FIG. 8, the horizontal direction is the main scanning direction along which the carriage travels. The vertical direction is the sub-scanning direction along which the recording medium is being fed, and the ink discharge ports are arranged. The intersecting points represented by dotted vertical and horizontal lines in FIG. 8 are lattice points in a recording density of 360 dpi. According to a printed example shown in FIG. 8, an image is formed by arranging dots only on the lattice points 360 dpi designated by a reference mark d1. The number of dots forming the image shown in FIG. 8 is 40 large ink droplets.

<High density printing mode>

Now, the high density printing mode will be described in accordance with the present embodiment.

Figure 9:
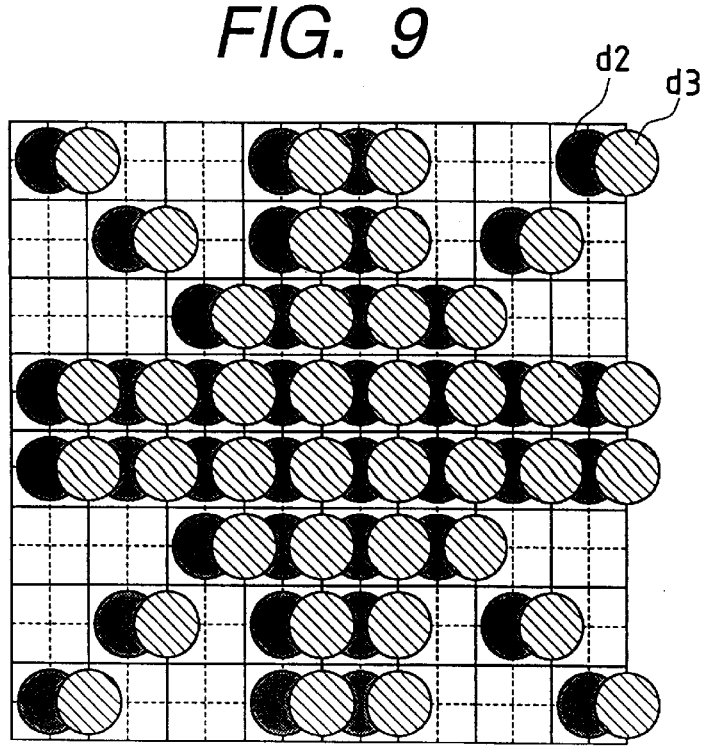
FIG. 9 is a view which shows the dot arrangement resulting from a recording whose density is made high in the main scanning direction.

FIG. 9 shows an example in which the same image recorded in FIG. 8 is now recorded in 720 dpi, that is, the image density is made twice in the main scanning direction. This printing method makes it possible to virtually attain high resolution recording by adding or reducing recording dots in the main scanning direction by use of the source image being recorded in 360 dpi. For the example shown in FIG. 9, two dots are arranged in one pixel of the image density of 360 dpi in the main scanning direction. In FIG. 9, too, the intersecting points represented by dotted vertical and horizontal lines are defined as the lattice points of 360 dpi. Those dots (d2) filled in with gray color in FIG. 9 are those recorded dots arranged on the lattice points. Those dots marked with slanted lines and designated by a reference mark d3 are the recorded dots positioned in locations offset by 720 dpi from the lattice points.

Figure 15:
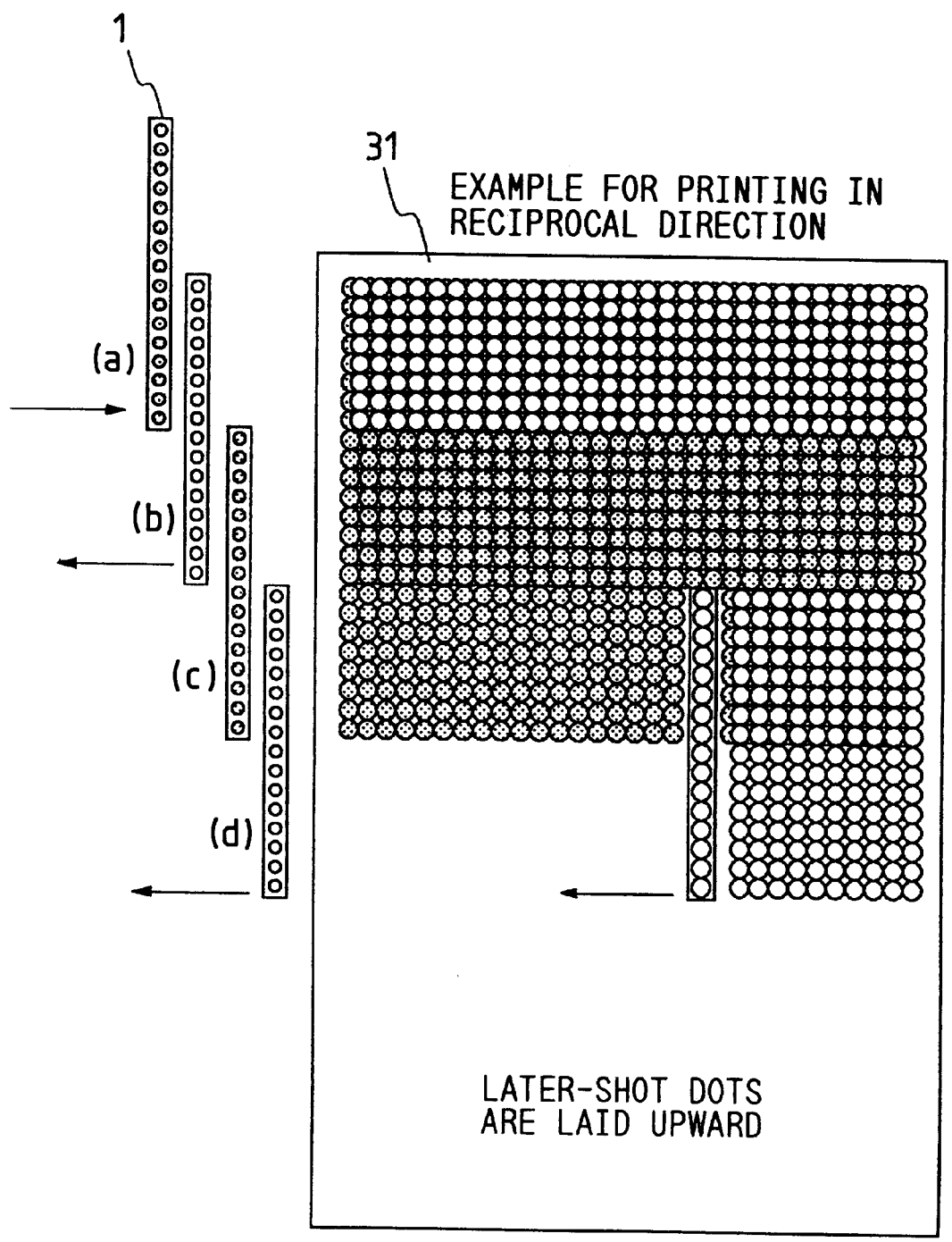
FIG. 15 is a view which shows the flow of a recording when high resolution image is formed by two scanning operations in the main scanning direction in a bidirectional printing.

The number of dots forming the image shown in FIG. 9 is 80, that is, two times the dot numbers forming the image shown in FIG. 8. As a specific printing method for performing high density printing in the main scanning direction as shown in FIG. 9, there is the method in which the traveling speed of a carriage having a print head on it is made ½ of the speed in the usual printing mode while the ink discharging frequency is kept in the same frequency of the usual printing mode or there is the method in which data are recorded without any intermittent arrangement while using the aforesaid multipass recording method: in this method, it is possible to attain high density recording by making an arrangement so that recording is performed simultaneously by positioning the recording dots at the second scanning in locations offset from the positions of the recorded dots at the first scanning by ½ pixel in the main scanning direction. FIG. 15 shows a method for making a recording density higher in the main scanning direction with the adoption of the latter method. The dots (d2) filled in gray in FIG. 9 are the recorded dots arranged on the lattice points of 360 dpi. These are printed by a forward scan shown in FIG. 15 (by a scanning from left to right in FIG. 15). Also, the dots d2 indicated by slanted lines are the recorded dots arranged with ½ pixel offset from the recorded positions of dots d1 of 360 dpi. These dots are recorded by a backward scan shown in FIG. 15 (by scanning the head from right to left in FIG. 15). The recording density provided by each scan in the reciprocal scanning is 360 dpi, which is the same as the usual low resolution recording. Therefore, the traveling speed of the carriage and the ink discharging frequency are kept remaining as those for low resolution recording. As a result, it takes more time to record an image of the same area because such area is dividedly recorded several times. Compared to a high speed printing mode, this is slower to the extent of such numbers of print divisions, but as described earlier with regard to the multipass printing, an image can be formed by use of different nozzles in the luster direction; hence making it possible to reduce the density unevenness resulting from the uneven discharging characteristics of the print head.

In the present embodiment, the two kinds of printing modes are switched over depending on the kinds of image: whether the data are characters or not. Usually, character data contain common control codes in them. Therefore, by detecting such coded information, it is possible to determine whether or not any characters are contained in image data. This detection may be possible by use of a host computer (CPU) dealing with image data or it may be possible to arrange such detection unit in the recording apparatus. Character data provide slanted and curved portions continuously. Therefore, by the application of high density printing mode described above, it is possible to materialize the printing of high quality images. Also, for the images other than the data in characters, high speed printing mode (low resolution recording) is used, because it is expected that such data often contain comparatively independent dots.

Figure 24:
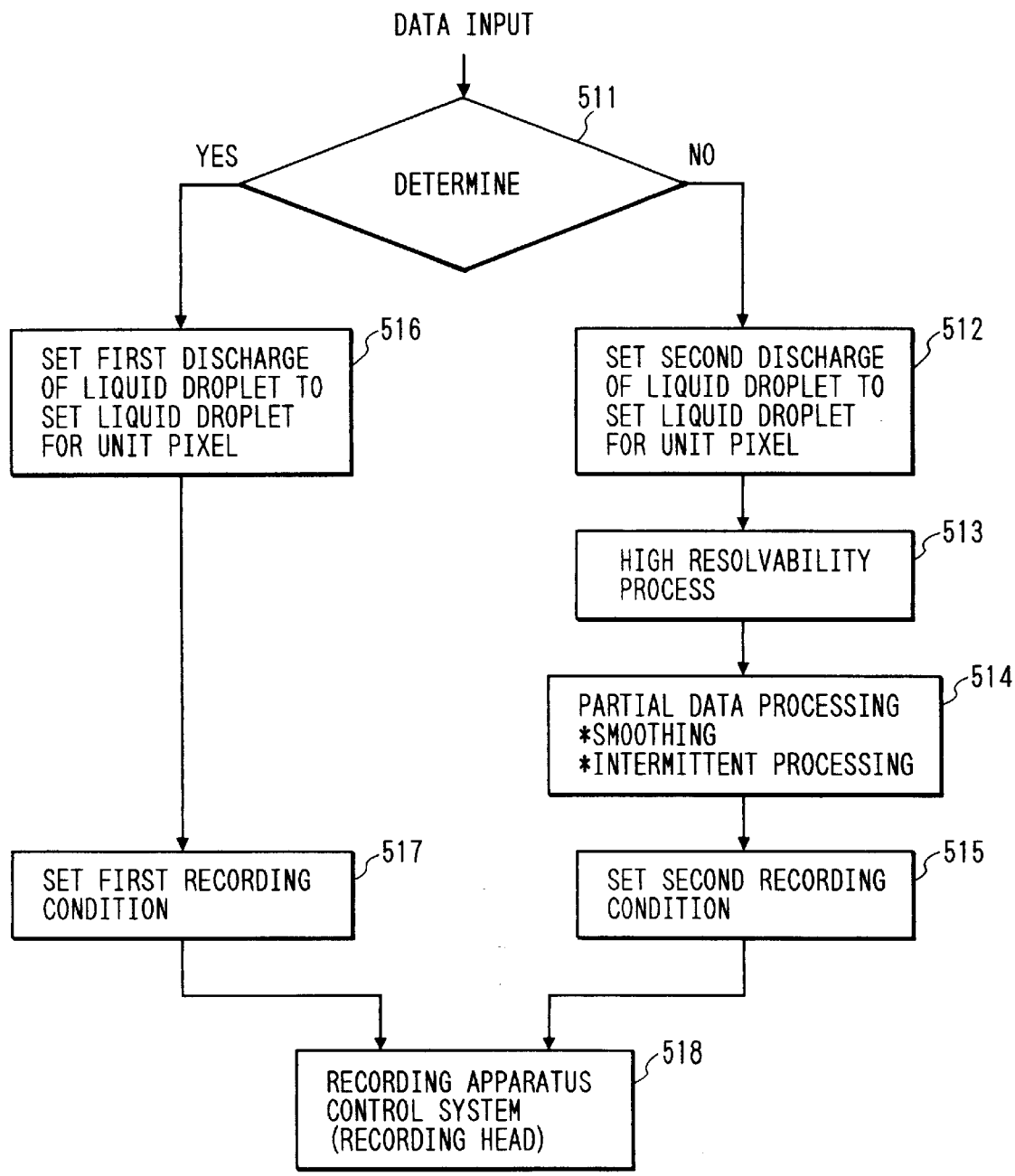
FIG. 24 is a block diagram illustrating a recording apparatus to which the present invention is applicable.

FIG. 24 is a functional block diagram, in which input data are determined in step 511. The criteria with which to determine the kinds of data are: black image or color image or any inclusion of bit images or not, among others, as described earlier. Also, it may be possible to arrange a structure so that a switching is provided to execute high resolution recording for an image that is designated by the user. If an arrangement of the kind is made, it is possible to provide a recorded image as desired by the user. This data determination can be arranged on the recording apparatus side as described earlier or a structure may be arranged to do it on the host side.

By making the printing modes changeable in accordance with image data in this way, it is possible to adopt a recording method suitable for the image data to be recorded; hence materializing a shorter recording time. In other words, only for the images requiring high density recording, a high quality recording is executed by a printing mode having lower recording speeds, while high speed printing mode is adopted for the images that present no problem even if its recording density is lower so that the recording time is made shorter eventually.

Also, in accordance with the present embodiment, the timing is set per unit page for the recording modes to be switched as described above. In this way, no switching is allowed between printing modes (the modes described in FIG. 14 and FIG. 15, for instance) while a page is being printed. Therefore, even when a plurality of different kinds of image data are mixedly present in one page, there is no possibility that the printing speed is changed. In this timing, switching can be actuated when image data are the same in a page. Also, there is no problem whether the kind of image data in a page is determined by the head data in the page or a method is adopted so that the kind of image data is determined depending on the ratio of contained images after referencing all the image data in the page.

As described above, images are formed by different diameters of recording ink droplets or different amounts of ink discharge depending on image data. Also, the recording operation is executed by switching printing modes corresponding to the printing mode using the aforesaid diameter of ink droplets or amount of ink discharge. Then it is possible to form images to be recorded in an excellent quality even in accordance with highly densified recording data.

Also, compared to the case where only high density recording is performed, it is possible to shorten the recording time.

Second Embodiment

In the present embodiment, an example will be represented to show that the cubic ratio is made different between the amount of ink discharge at the time of recording in low resolution and that of ink discharge at the time of recording in high resolution on the basis of the example of the high density printing described in the first embodiment.

In accordance with the present invention, the cubic ratio of discharging ink droplets is almost 4:1 between dots (large ink droplets) to be discharged for recording in low resolution and comparatively small dots (small ink droplets) to be discharged for recording in high resolution. Assuming that ink droplets of approximately 80 pl are arranged in one pixel formed by 360 dpi×360 dpi, the discharging amount of large ink droplets is set at approximately 80 pl, and that of small ink droplets, approximately 20 pl. In the present embodiment, too, printing is performed by dividing it for the high density printing mode and high speed printing mode as in the first embodiment. Then it is made possible to shorten the printing time corresponding to the kinds of recording images, and also, form images recorded in an excellent quality in high resolution for the image data requiring high density printing.

Figure 1:
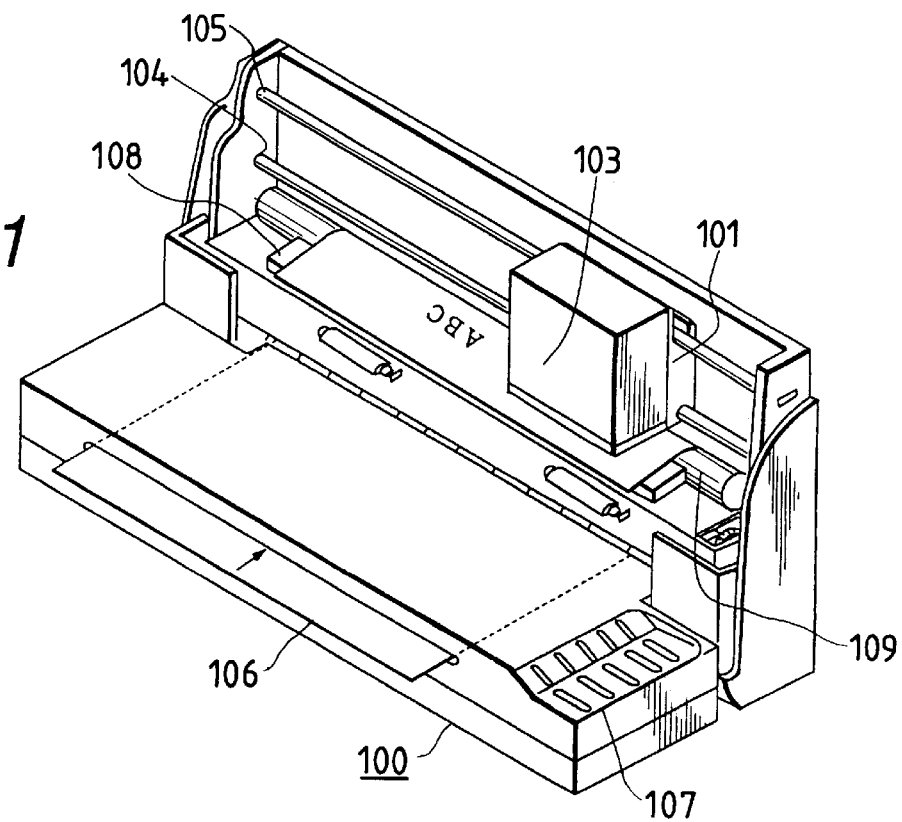
FIG. 1 is a perspective view showing an ink jet recording apparatus to which the present invention is applicable.
Figure 10:
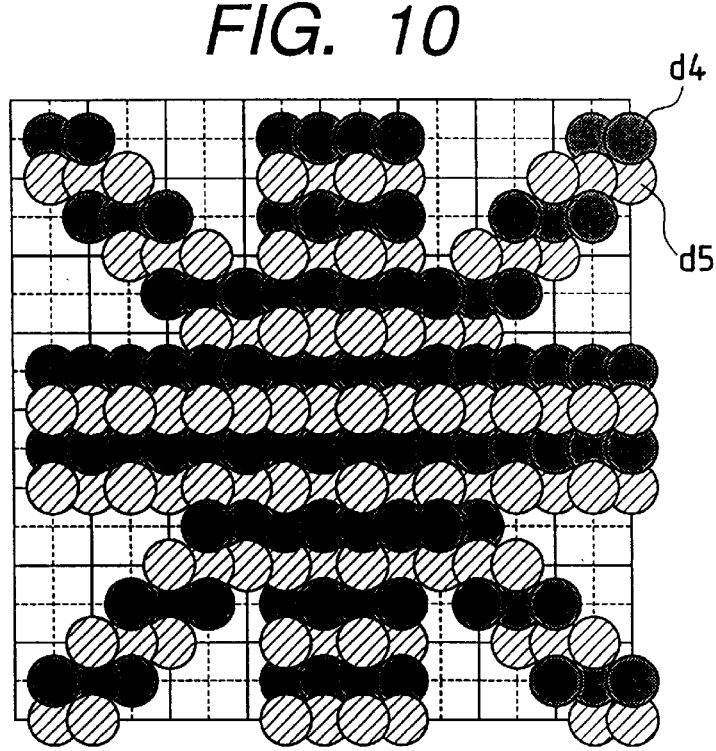
FIG. 10 is a view which shows the dot arrangement resulting from a recording in a high density (high resolution).

FIG. 10 shows the dot arrangement in high density printing mode. The discharging amount ratio is 4:1 between the different dots, large and small in size. Therefore, four small ink droplets are arranged in one pixel of 360 dpi×360 dpi in place of one large ink droplet formed in it. As in FIG. 1 shown earlier, the intersecting points of dotted vertical and horizontal lines are lattice points of 360 dpi. Consequently, it is indicated that the dots arranged on the solid vertical and horizontal lines are those recorded in positions offset by a portion of half pixel of 360 dpi (one pixel portion of 720 dpi). Also, the dots d4 filled in gray are those recorded in a density of 720 dpi in the main scanning direction and a unit of 360 dpi in the sub-scanning direction. Also, the dots d5 indicated by slanted lines are those recorded in positions of dots d4 offset in the sub-scanning direction by half pixel portion of 360 dpi pixel. In the present embodiment, recording is performed by arranging 176 dots formed by small ink droplets.

When obtaining a recorded image in high resolution as shown in FIG. 10, the input data to be recorded are for images in low resolution as shown in FIG. 8. Thus it is necessary to prepare recording data for recording in high resolution. Hereunder, the description will be made of procedures to obtain image data for recording images in high resolution as shown in FIG. 10 from the image data in low resolution shown in FIG. 8.

At first, the source image data shown in FIG. 8 are arranged into data corresponding to four times the source image data in the resolution, each two times vertically and horizontally in four positions around the source image data: the four positions are those of "source image data", "right of source image data", "under the source image data", and "lower right of the source image data". Then, in continuation, on the basis of data thus prepared, one dot data of high resolution recording unit is added to a corner if the corner is an edge portion both in the vertical and horizontal directions formed by consecutive two dots. However, if such edge portion is formed by consecutive four or more dots either in horizontal or vertical direction, it is assumed that there is no data to be added.

With the processes described above, it is possible to obtain the image data shown in FIG. 10 from the image data shown in FIG. 8. This method is also applicable as one example of smoothing processing, but some other method may also be applicable to the smoothing processing itself.

Figure 16:
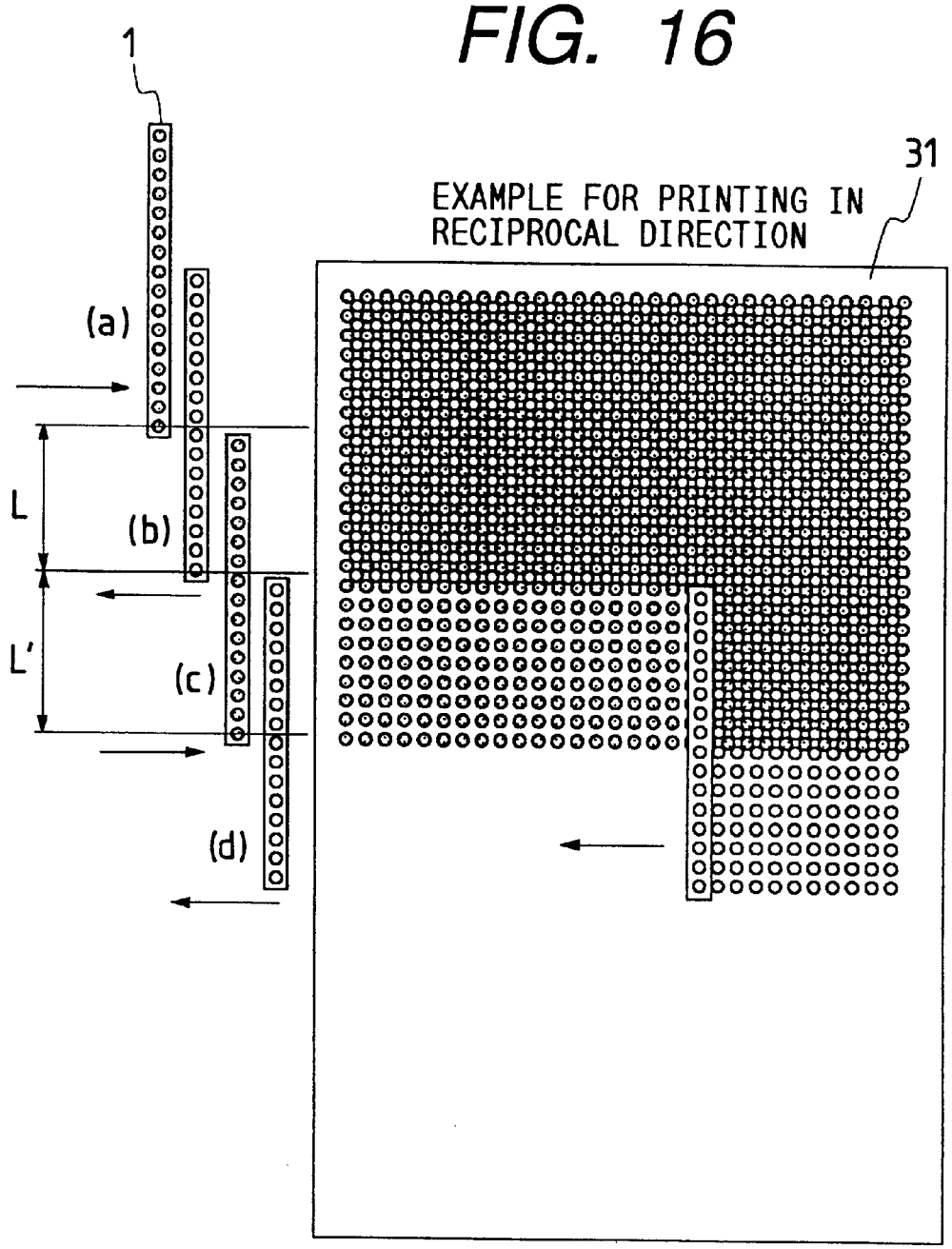
FIG. 16 is a view which shows a printing method for executing high density recording both in the main scanning direction and sub-scanning direction.

Now, in conjunction with FIG. 16, a recording method will be described in accordance with the present embodiment. In the present embodiment, recording is performed in a pixel density of 720 dpi even in the sub-scanning direction (the direction in which a recording sheet is fed). Therefore, it is necessary to feed the recording sheet by a portion offset by half pixel portion of 360 dpi where nozzles are arranged. FIG. 16 illustrates the number of ink discharge ports in one head, which is sixteen in it. At first, when recording is performed by allowing the recording head to scan from left to right in FIG. 16 (scanning in the forward direction), a printing is made in a pixel density of 360 dpi in the sub-scanning direction. In FIG. 16, these are represented by gray circles. Then, when a recording is performed by allowing the recording head to scan from right to left in FIG. 16 (scanning in the backward direction), a printing is made in positions offset by half pixel portion of 360 dpi in the sub-scanning direction from those of recording at the time of scanning in the forward direction. In other words, the feeding amount L of the recording medium is set at a portion equivalent to 7.5 nozzles. In this way, it is possible to record dots d5 indicated by slant lines in FIG. 10. In FIG. 16, these are shown by white circles to make them easily recognizable. Then, in continuation, the recording medium is fed by an amount L' (equivalent to 8.5 nozzle portion) to perform recording in a density of 360 dpi in the sub-scanning direction. By repeating these operations, the feeding is completed by reciprocal scanning for a portion of 16 nozzles, that is, the width of the entire discharge ports. By using the feed of a recording medium, which is offset each by half pixel portion of 360 dpi as described above, and a multipass recording method as well in combination, it is possible to perform high density recording of 720 dpi both in the main and sub-scanning directions.

In accordance with the present embodiment, the kinds of recording images serving as criteria for determining recording mode switching are: color images or black images, for example. Usually, it is possible to obtain a better printing effect when black images are recorded in high density than color images. This is because black is more conspicuous in a recorded image while there are more images in black requiring reproducibility of curved lines like characters, among some other reasons. It may be possible to analyze image data on a host computer to determine whether the objective images are in black or in color or to provide the recording apparatus main body with such function to determine the kind of recording images. Also, it may be possible to effectuate the recording mode switching after determining whether or not any data are present so that the black head should be driven.

Also, the printing mode switching described above is executed in a page according to the present embodiment. When a printing mode is switched in a page, the lines requiring high density recording (black images in the present embodiment) are recorded in a high density of 720 dpi. If the recording image changes into a color image, printing is executed in high speed printing mode in low resolution as shown in FIG. 8. In this respect, when executing a color recording, its ink amount is small in some cases as compared to black ink droplets because the mixture of secondary colors or the like takes place. As an example, when the discharging cubic ratio is 4:1 between ink droplets of color ink (CMY) in different sizes, large and small, the ratio of ink amounts becomes 40 (pl):10 (pl) accordingly.

FIG. 17 shows an example of image arrangement according to the printing data for which printing mode switching is expected in a page. The image example shown in FIG. 17 illustrates combinations of plural kinds of images arranged on a recording medium. As the printing mode is determined according to black images or color images in the present embodiment, the areas designated by reference marks A, D, E, and G are printed in high density printing mode because black images are contained in each of such areas. The other image areas are printed in high speed printing mode in low resolution as shown in FIG. 8 if there is no black data contained in them. However, in the present embodiment, any black image in a color image is defined as a black image because priority is given to printing in black. Besides, if there are no other data than those in black on one line, such line is defined as a black image in some cases. By this definition, the high density recording mode is applied to only the area A in FIG. 17, but in all other areas, the printing modes may change depending on the presence or absence of black data.

Also, it may be possible to switch printing modes by the kinds of recording images per resolution in the example described above. As an example, it may be possible to execute switching depending on whether the resolution of a recording image is higher or lower than the resolution of a print head or on whether the resolution of an image data is higher or lower than a given resolution (360 dpi or 300 dpi) serving as a threshold value.

Third Embodiment

Figure 11:
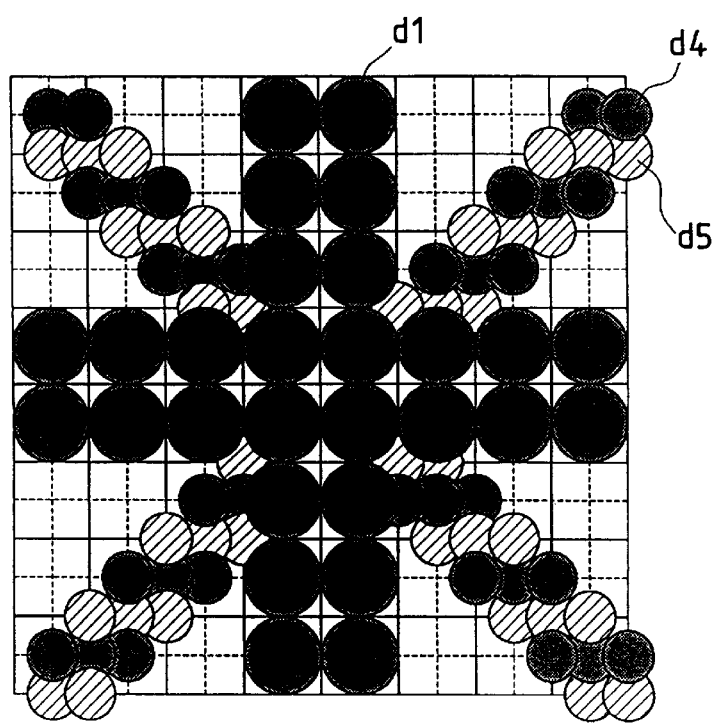
FIG. 11 is a view which shows the arrangement of recording dots for recording to be performed for the achievement of the longer life of a recording head.

FIG. 11 shows the arrangement of dots recorded in accordance with the present invention. In the area where image data are continuous more than a certain value in the present invention, recording is made in low resolution by large dots, not in high resolution by small ink droplets. In a recorded image, dots of large ink droplets to record in low resolution and those of small ink droplets to record in high resolution are mixedly arranged.

For the example shown in FIG. 11, switching is made so that only lines horizontally continuous are recorded in low resolution, but the present invention is not limited thereto. In accordance with the present invention, it is possible to achieve a longer life of the print head.

As described in the first embodiment, if a recording method uses piezoelectric elements as means for discharging ink from a print head, electromechanical transducing is performed when driving signals are applied to the piezoelectric elements, thereby to discharge ink. If a recording method uses electrothermal transducing elements as means for discharging ink, heat and bubbles are generated when energizing the heater units serving as means for discharging ink. Hence ink droplets are discharged from ink discharge ports. In either method, the more the number of discharges (driving), the greater the ink discharge performance changes due to mechanical or thermal friction or deterioration: in the worst, the discharge performance is degraded eventually. Here, therefore, it is possible to prolong the life of the print head (that is, to increase the number of recordable sheets per head) by reducing the frequency in which driving is given to ink discharge ports in a portion where it can dispense with driving, depending on the kinds of images to be recorded.

Now, the description will be made of the printing method for making the dot arrangement shown in FIG. 11. As in the previous example, the intersecting points of the dotted vertical and horizontal lines are the lattice points of 360 dpi pixels. Those designated by reference marks d1 and d4 are dots recorded on the 360 dpi lattice points in the sub-scanning direction. Also, those designated by a reference mark d1 are dots recorded in low resolution of 360 dpi in the main and sub-scanning directions, and those by d4 are dots recorded in high resolution of 720 dpi in the main scanning direction. Also, the dots d5 indicated by slanted lines are those arranged in positions offset by half pixel portion in the sub-scanning direction. As clear from FIG. 11, large and small dots are mixedly present in one and same luster (in the main scanning direction). Consequently, the printing is performed in the procedures given below. Hereunder, in conjunction with FIG. 16, the procedures will be described.

Of the dots d1 and d4 printed in unit pixel of 360 dpi in the sub-scanning direction, the dots d1 are recorded at first with the scanning in the forward direction by large ink droplets in low resolution, and then, the small dots d4 are recorded in high resolution with the scanning in the backward direction that is a returning scan of the carriage without feeding the recording medium. After that, the recording medium is fed by a width L. Then the dots d5 are recorded in high resolution on the lattice points offset by half pixel portion of 360 dpi in the sub-scanning direction. In order to allow dots to be mixedly present in different resolutions in the main scanning direction, it should be good enough if only dots are recorded on the same lattice points in low and high resolutions by reciprocal main scans without feeding a recording medium, and then, after feeding the recording medium, dots are recorded in low resolution in the positions offset by half pixel portion from the lattice points of 360 dpi.

Now, the description will be made of the operation described above in accordance with an example shown in FIG. 16 illustrating the relative positions between a recording head 1 and recording image. At first, when the recording is positioned at (a), dots d1 are recorded with scanning in the forward direction by large ink droplets in low resolution. Then, without feeding the recording medium, dots d4 are recorded in high resolution by the recording head 1 still positioned at (a) while scanning in the backward direction. Thus, with the recording medium being fed by a width L, the lattice points are allowed to be positioned in the locations offset by half pixel portion of 360 dpi each from the lattice points of the dots recorded by the last reciprocal scanning. In this way, dots d5 are recorded. Now, preceding the next recording, the recording medium is fed by a width L', and then, the dots d1 and d4 are again recorded by the reciprocal scanning. As a result of the two-time feeding, the recording medium has been fed by a portion equivalent to the width of L+L', that is, the entire width of nozzles, hence making the recorded image continuous.

For the print example shown in FIG. 11 according to the present embodiment, 97 dots are arranged in total, combining dots of different sizes, large and small. In contrast, the dots recorded for an image in high resolution, which are all arranged by small ink droplets, are 176 in total as shown in FIG. 10. As described above, in an area where image data are continuous, such as line portions continuing vertically and horizontally as arranged in the present embodiment, it is possible to reduce the dot numbers to be recorded in a specific area, which is directly related to the driving frequency of the print head, by executing recording in low resolution by large ink droplets to enable different dots in large size to be mixedly present in such area. Actually, a dot formed by a large ink droplet is able to record the same area that should be covered by a plurality of recording dots if small ink droplets are used, although this condition depends on the rate of discharging amount of dots formed by the small ink droplets. Consequently, it is possible to reduce the driving frequency of the print head significantly according to images to be recorded. Also, the area that is recorded in low resolution by large ink droplets is an area where image data are continuous. Therefore, compared to an image recorded in high resolution, there is no significant difference observable in such area with the exception of extremely small difference in the edge portions.

With the adoption of the structure shown in the present embodiment, it is possible to increase the sheet numbers of the medium recordable by a print head (that is, to prolong the life of the recording head).

Also, as another printing method, the print head is arranged in a recording apparatus to make printing possible by its ink discharge ports in positions offset by half pitches of an image in low resolution in the sub-scanning direction. In this way, it is possible to arrange printing by three-time scans (forward scanning and sub-scanning are counted as one time, respectively) as printing executable by two-time scanning by the application of method described in conjunction with FIG. 16. FIG. 6A shows a print head, which is structured to execute recording as described above. In FIG. 6A, only the black head is provided with two arrays (1K and 1K') of discharge ports, while CMY discharge ports are each provided with only one allay, respectively. One head 1K' of the black heads is arranged in a position offset half pixel portion (half the pitches of ink discharge ports) in the sub-scanning direction with respect to the other heads. Therefore, when recording is executed in high resolution, the dots d4 shown in FIG. 11 are printed by the head 1K in FIG. 6A, while the dots d5 are printed by the head 1K' arranged adjacent thereto in a position offset half pixel portion in the sub-scanning direction so that it can execute printing simultaneously in the same scan. Also, the dots recorded by large ink droplets in low resolution are recorded by use of the head 1K without feeding the recording medium. With two black heads thus arranged, dot numbers to be printed per head can be reduced. The effects produced by the present embodiment are apparent by comparison between dot numbers required to form images shown in FIG. 10 and FIG. 11.

In accordance with the embodiment described above, scanning to form images by discharging large ink droplets, and scanning to form images by discharging small ink droplets are separated, and then, recorded images in low resolution and those in high resolution are arranged to be mixedly present. Since scans are divided into a plurality, there are almost no disturbance when ink flows in, which tends to occur by discharging ink droplets in different discharging amounts. As a result, it is possible to carry out stabilized ink discharging.

Fourth Embodiment

In accordance with the embodiments up to the third described above, the highly precise recording is materialized in high density by arranging a plurality of small dots formed by small ink droplets in a pixel in low resolution in place of large dots formed by large ink droplets in low resolution. Compared to an original image shown in FIG. 8, the small-doted portion of the recorded image shown in FIG. 11 is shifted in the lower right direction in FIG. 11. This shift has taken place due to the dot arrangement where the lattice points formed by the application of pixel density of 360 dpi and those by the pixel density of 720 dpi are made mixedly present. Depending on the kinds of recording media and image data, this slight dot offset becomes conspicuous. Therefore, in accordance with the present embodiment, it is made possible to set the positions of dot arrangement with respect to large and small ink droplets in order to reduce the offset of dot arrangement affected by resolutions to optimize the mode of the present invention.

Figure 12A:
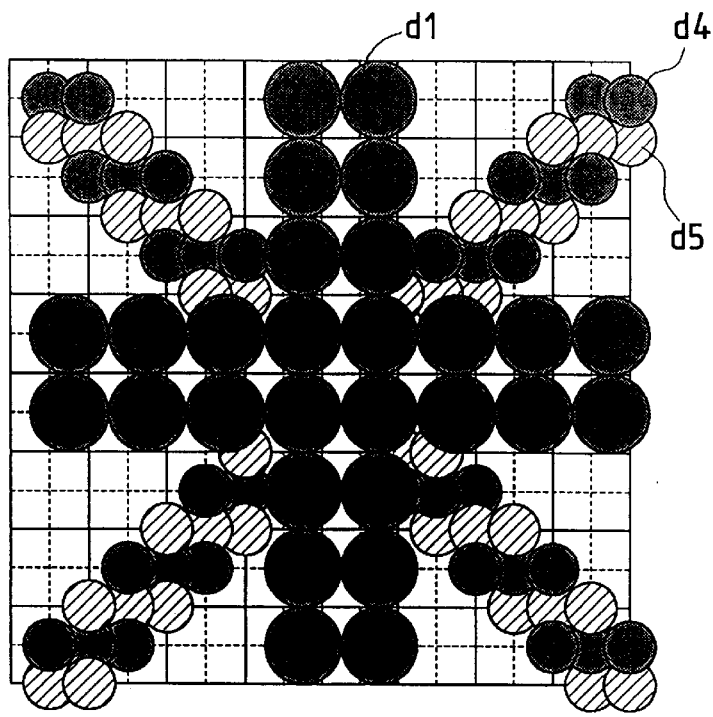
FIGS. 12A, 12B and 13 are views showing the dot prevention measures when data in different resolutions are mixedly present.
Figure 12B:
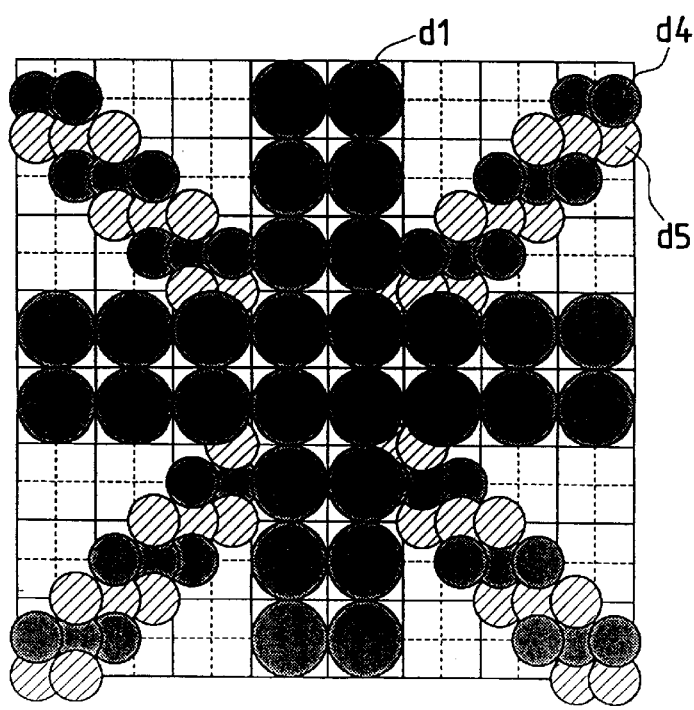

In FIG. 12A, the offset in the main scanning direction is corrected by arranging the timing to start recording large dots itself to lag behind by separating its printing scans from those of the small dots. If the positions for the carriage 201 shown in FIG. 7 to start recording are offset ¼ pixel portion per unit pixel of 360 dpi in each of the printing scans for recording in high and low resolutions, it is possible to arrange large and small dots like gray circles represented in FIG. 12A. The dots d1 are recorded in resolution of 360 dpi by offsetting them ¼ pixel portion in the main scanning direction to make it possible to eliminate the offset with the image formed by dots d4 and d5 recorded in high resolution in the main scanning direction; thus forming the recorded images in high quality. Also, it may be possible to arrange the dots, which are recorded by offsetting ¼ pixel portion per unit pixel of 360 dpi each, as small dots d4 and d5, because the images formed by large and small dots are relatively offset in the conventional images. FIG. 12B illustrates a case where printing is started to record dots in low resolution by offsetting them ¼ pixel portion per unit pixel of 360 dpi each in the main scanning direction. In either cases in FIGS. 12A and 12B, it is clear that compared to the case in FIG. 11, the positional relations between dots in low and high resolutions are made more appropriate.

Figure 13:
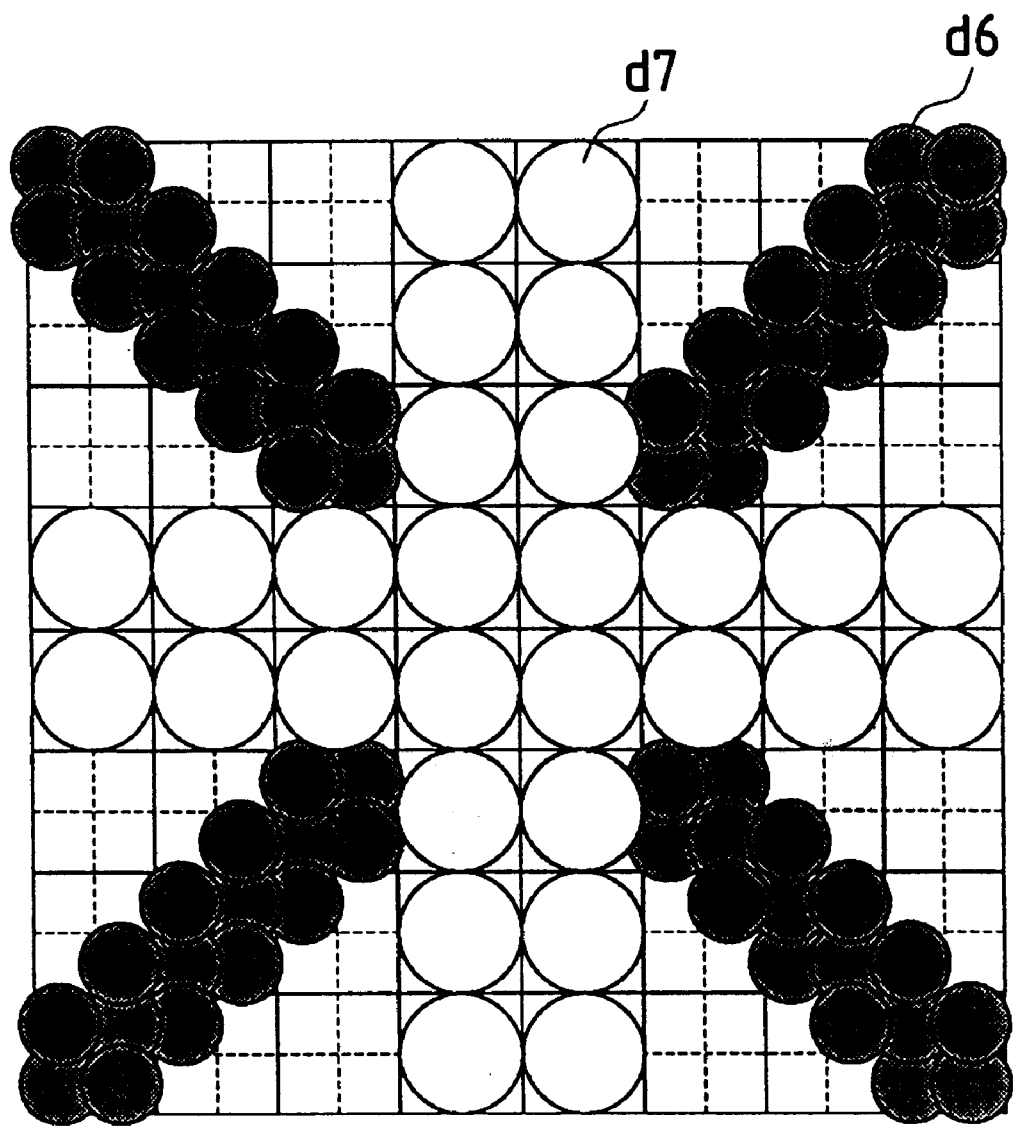

Also, as shown in FIG. 6A, using two black heads, which are arranged to execute printing in positions offset half pixel portion from each other, it is possible to print dots in positions offset ¼ pixel portion per unit pixel of 360 dpi in the sub-scanning direction. Now, in conjunction with FIG. 13, the description will be made of the steps of forming images by use of heads structured as above. At first, with the carriage scan in the forward direction, the two heads described above are driven simultaneously to record dots d6 in high resolution as represented in FIG. 13. Then, with a print head shown in FIG. 9, for instance, the feed amount L in the sub-scanning direction is defined as L=16/2−¼=7.75 (pixel portion). A recording medium is fed accordingly. Subsequently, using either one of black heads 1K and 1K' shown in FIG. 6A along with the carriage scan in the backward direction, recording is performed in low resolution by image density of 360 dpi in the sub-scanning direction. The dots recorded in the backward direction are those dots designated by a reference mark d7 in FIG. 13. Then, for the preparation of next recording, the recording medium is fed by L'=16/2+¼=8.25 pixel portion, thus printing being executed by the scan in the forward direction. With such forward scan, only the dots formed by small ink droplets are recorded in high resolution, while only the dots formed by large ink droplets are recording in low resolution in the sub-scanning direction. In this way, two dots are arranged by ink droplets at pixel pitch of 720 dpi, and a large dot is arranged at pitch of 360 dpi in the sub-scanning direction. Therefore, the lattice points of dots d6 recorded in high resolution of 720 dpi with the scan in the forward direction and those of dots d7 recording in resolution of 360 dpi with the scan in the backward direction are arranged to be offset by ¼ pixel portion of a pixel of 360 dpi in the main and sub-scanning directions.

As described above, dots to be recorded in low and high resolutions can be arranged in four-time density (¼ unit pixel of 360 dpi) of the pitches of the print head, thereby to make it possible to obtain a good result of printing.

Fifth Embodiment

Now, the detailed description will be made of a fifth embodiment in accordance with the present invention.

Figure 22:
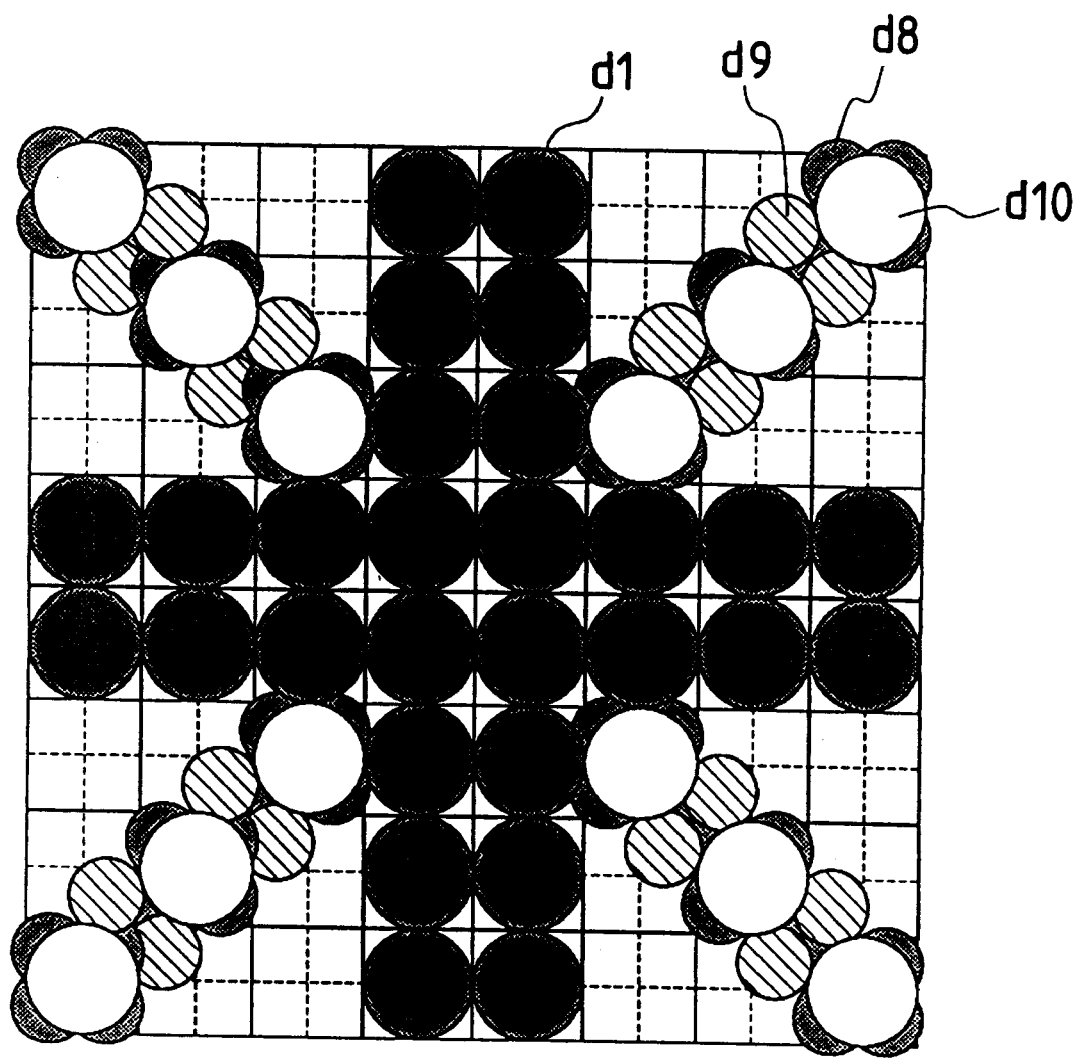
FIG. 22 is a view which shows the dot arrangement for a double impacting mode in which superposed prints are executed by a two-time printing using dots in different sizes, large and small.

With a double impacting mode of the present embodiment, it is possible to achieve the density enhancement of images without lowering the effects of high resolution printing by arranging ink droplets in the positions of dots in different sizes and resolutions. FIG. 22 shows the dot arrangement by the double impacting printing in accordance with the present embodiment. In this embodiment, on the dots that have been formed by large ink droplets, dots are again impacted with large ink droplets to superpose them on the previous ones. Also, on the dots that have been formed by small ink droplets for use of high resolution recording, dots formed by large ink droplets for use of low resolution recording are superposed on the lattice points of the low resolution recording (360 dpi).

On the image recorded in high density, plural small dots are again arranged in high density. The ink amount on the imaging area becomes great. As a result, there is a possibility that ink is caused to run or flow out to blur the edges of an image. In order to prevent a problem of the kind, the dots formed by large ink droplets are arranged on the lattice points in low resolution, which are different from the lattice points recorded in high resolution, so that the second ink droplets do not affect the small dots d9. With this arrangement, the density enhancement of an image is attained without any degradation that may take place on the image edges due to the excessive amount of ink to be impacted. Also, the area where dots are to be superposed by the application of double impacting is not necessarily a total area of an image. It may be possible to superpose large dots only on the portions where small dots are formed, for example.

Sixth Embodiment

Now, a sixth embodiment of the present invention will be described.

A serial type ink jet recording apparatus adopted for the present embodiment is the same as the ink jet recording apparatus shown in FIG. 7 in accordance with the first embodiment. Also, the structure of the recording head is the same as the one described in conjunction with FIG. 5 and FIG. 6B. Therefore, the detailed description thereof will be omitted. In the present embodiment, it is also assumed that as described in the previous embodiment, its structure is arranged to be capable of selectively recording images in usual resolution (360 dpi as in the previous embodiment) and those in high resolution by recording dots of different sizes, large and small. Also, as in the first embodiment, the mode in which recording is executed in resolution of 360 dpi is called high speed recording mode or low resolution recording, and the mode in which recording is executed in high resolution may also be called high density recording mode.

In conjunction with FIG. 25, the description will be made of the present embodiment to prevent image degradation in the portions where printing modes are changed while using a recording apparatus shown in the previous embodiment. In this respect, the recording head of the present embodiment is represented by an example in which ink droplets of different diameters can be discharged as dots from one and the same head (the same nozzles and discharge ports). Large dot group in a lattice represents a case where the dots are recorded in resolution or shows dot diameter such as applicable in high speed mode described earlier, and the small dot group represents a case where dots are recorded in high density recording mode.

Figure 25:
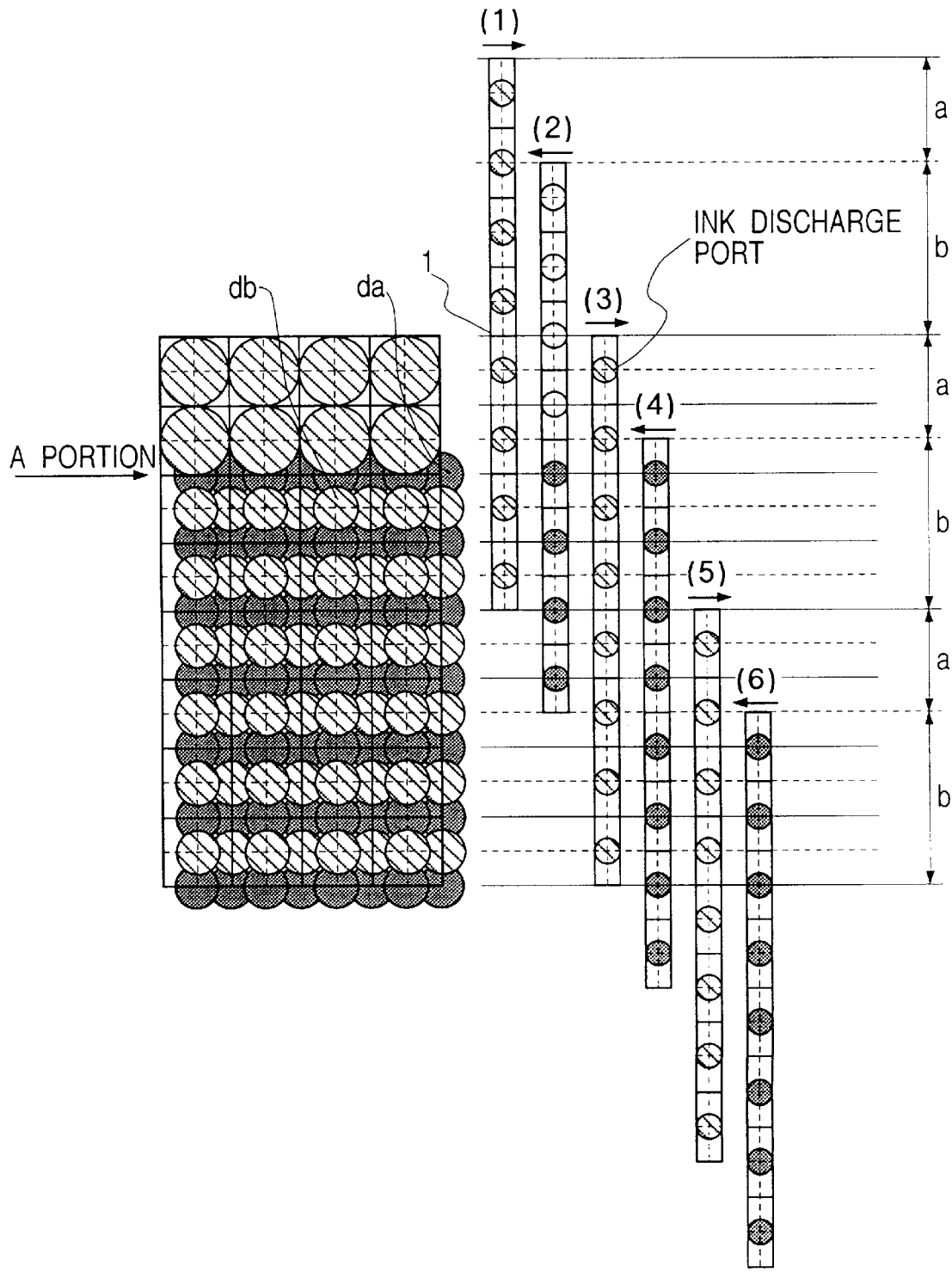
FIGS. 25, 26, and FIGS. 27A to 27F are views showing the arrangement of recording dots in accordance with one embodiment of the present invention.
Figure 35:
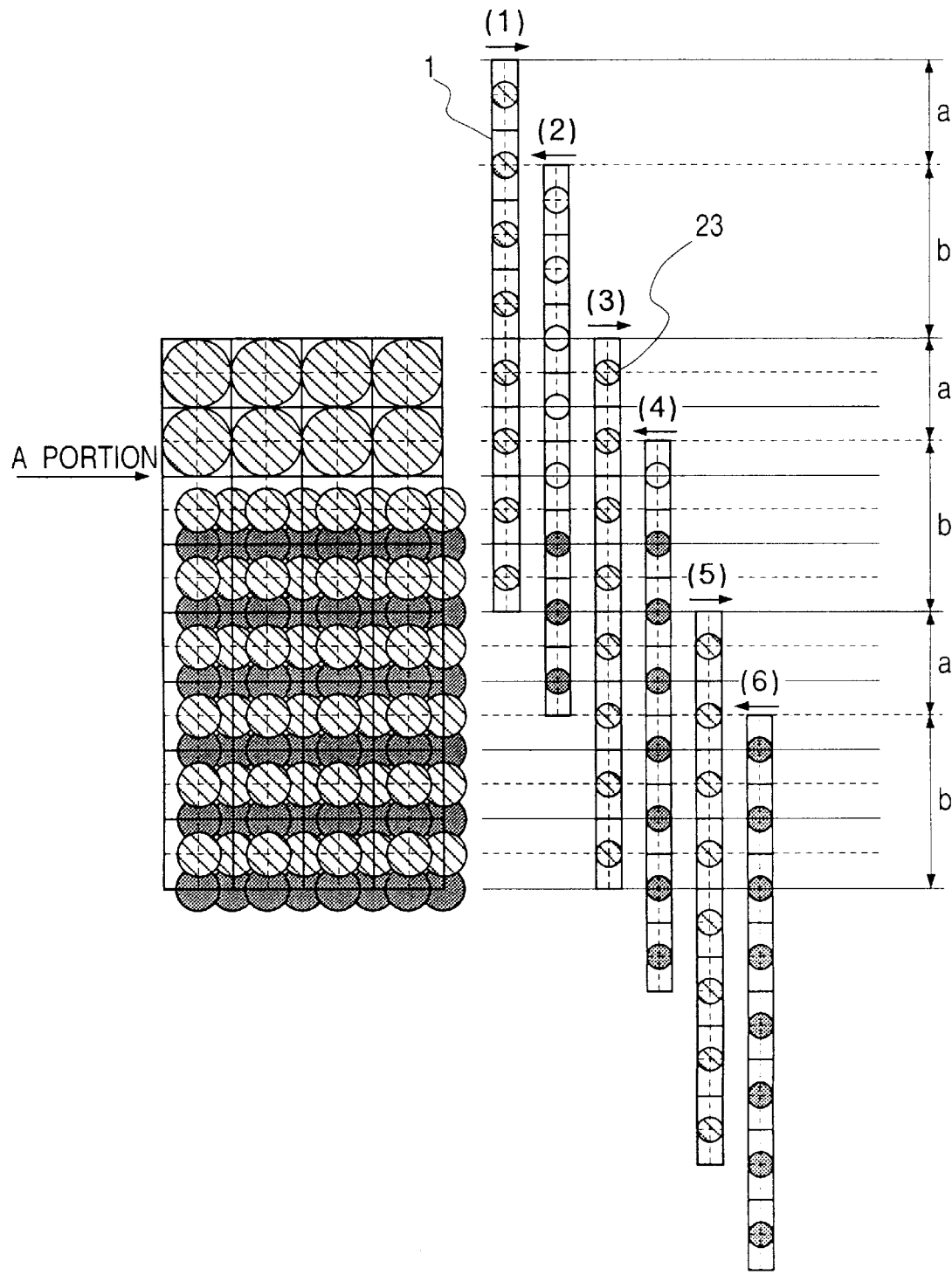
FIG. 35 and FIGS. 36A and 36B are views showing the resolution changing portions in the conventional image in which images in different resolutions are mixedly present.

As clear from comparison between representations in FIG. 25 and FIG. 35, the lattice points of dot arrangement between each of the printing modes are offset, and the dots da indicated by gray circles are arranged in the portion A in FIG. 25, that is, the printing mode changing portion, so as to avoid, by the adoption of the present embodiment, creation of any gaps where no dots are arranged because of the different dot sizes to be applied. In this way, the white streaks appearing in the representation in FIG. 35 are eliminated. The recording methods related to the arrangements shown in FIG. 35 and FIG. 25 have already been described earlier when the multipass recording method is discussed. In other words, density unevenness or the like resulting from the print head and others using different ink discharge ports are removed as far as recording is concerned in the luster direction. From FIG. 25, it is understandable that the image formation is executed by use of two ink discharge ports in the luster direction (main scanning direction). Also, in FIG. 35 and FIG. 25, the half pixel feeds are performed as described earlier. As a result, given the nozzle interval as 1, a, which is equivalent to 1.5 nozzle width, and b, which is equivalent to 2.5 nozzle width, are repeatedly set alternately.

Also, in the example shown in FIG. 25, all the dots are arranged on the portion for the printing modes to change, but the present invention is not necessarily limited to such arrangement.

Figure 27A:
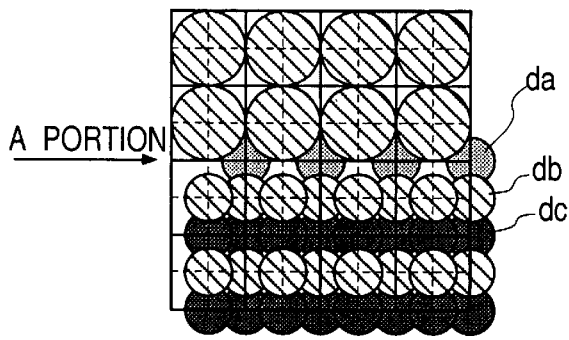
Figure 27D:
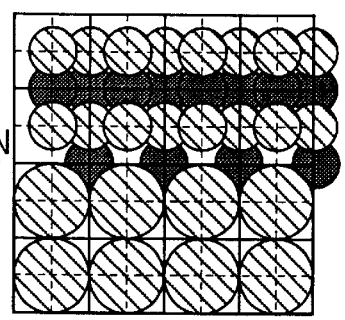
Figure 27B:
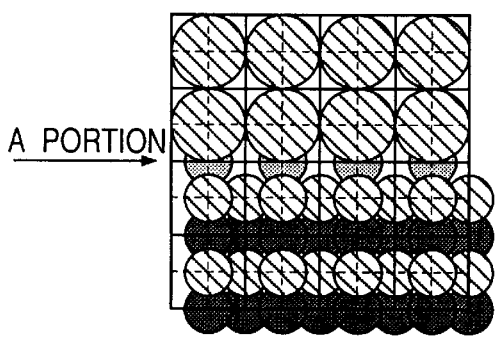
Figure 27E:
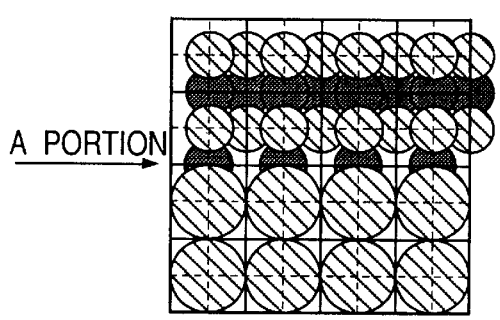
Figure 27C:
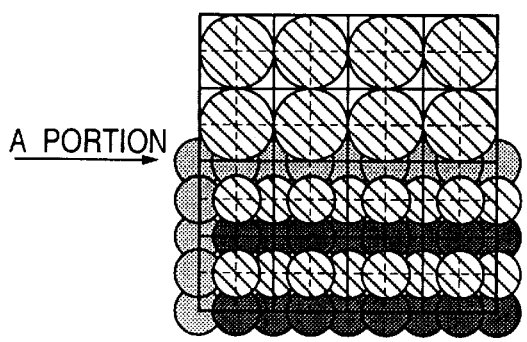

FIGS. 27A to 27F show the example of an image in which recording dots are supplementarily arranged in the portion A in the boundary area for the printing modes to change. FIGS. 27A and 27B illustrate an example in which the recording dots to supplement the boundary area A are recorded intermittently. In FIG. 27A, a reference mark da designates additional dots, the dots supplementarily recorded. These are particularly effective to a recording medium whose amount of ink reception is small, such as an OHP sheet. With the dots supplementarily recorded, it is possible to prevent ink from running, and obtain a good result of recording. Also, an example shown in FIG. 27C is such as to correct the offset of record starting position of each image to be recorded in high speed mode and high density printing mode, respectively, in the boundary for the printing modes to change. On the left side (the side on which printing begins) of the imaging area in high density printing mode, correction dots are additionally recorded in this respect.

Figure 27F:
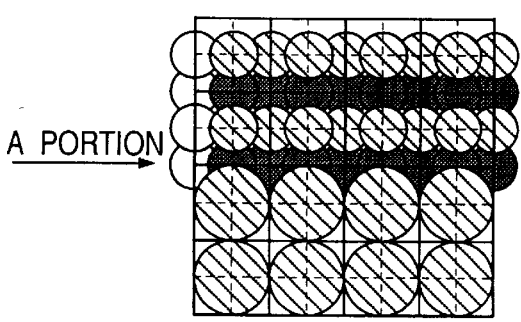

Also, FIGS. 27D, 27E, and 27F illustrate the dot arrangements when printing modes change from high density printing mode to high speed printing mode, respectively. In these cases, the image recorded in high density printing mode is superposed on the image recorded in high speed printing mode to increase the density in the boundary area. As a result, these appear as black streaks in the image. Therefore, the dots positioned in the boundary area are intermitted for the execution of recording as shown in FIGS. 27D and 27E. In this way, it is possible to obtain a recorded image in a good condition. Also, FIG. 27F is an example in which dots are added to correct the main scanning offset of images in different printing modes as in the example shown in FIG. 27C.

Figure 28:
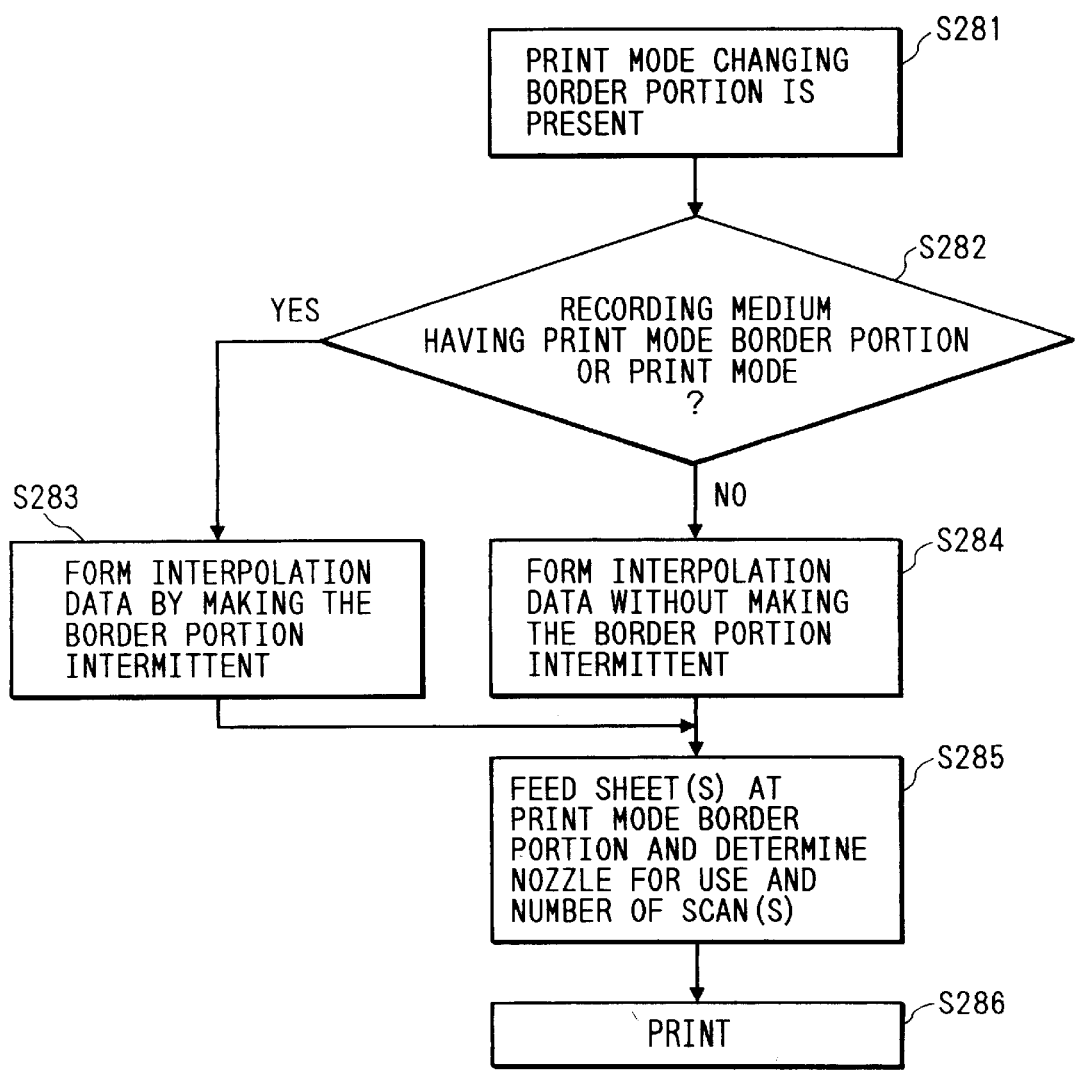
FIG. 28 is a flowchart showing the procedures required to achieve each recording shown in FIG. 25 and FIGS. 27A to 27F.

FIG. 28 is a flowchart showing the steps of correcting image data for boundary portion if any boundary portion exists in a image to require changes of printing modes. Hereunder, the procedures will be described in accordance with this flowchart.

At first, when a boundary area exists so that printing modes should change, the process shifts from step S281 to S282 in order to determine whether or not interpolating data are to be intermitted for the execution of recording in the corresponding boundary area.

In the step S282, if conditions should be defined to prepare interpolating data in accordance with the recording medium, the conditions are set in consideration of the amount of ink that such medium can receive. If a recording medium is a plastic sheet or the like, which is superior in transparency, suitably usable for an overhead projector (OHP sheet), but the amount of its ink reception is small, the process shifts to step S283 where data are prepared so as to record supplementary dots intermittently in the boundary areas like those shown in FIG. 27A and 27B.

Also, in the step S282, if the recording medium is such as those having comparatively large amount of ink reception (a coated paper having ink reception layer, an ordinary paper, or the like), the process shifts to step S284 where data are prepared to record supplementary dots on such boundary area like the one shown in FIG. 25. In accordance with the interpolating data prepared in the steps S283 and S284, each condition is determined in step S285 for the feed of the recording medium in the printing mode boundary portion, nozzles to be used for recording, frequency of recording scans in the imaging area in the boundary portion, among others. Then, printing is executed in the subsequent step S286.

Now, the description will be made of a case where conditions required for correction should be determined with respect to the boundary portion for the printing modes to change: here, the conditions are set in accordance with the printing mode that has been changed in the step S282. In the step S282, if the printing mode is changed from high speed printing mode to high density printing mode, the process shifts to step S284 where data are prepared for executing a recording in the boundary area with supplement of recording dots as shown in FIG. 25. Also, in the step S282, if the printing mode is changed from high density printing mode to high speed printing mode, the process shifts to step S283 because the boundary areas for these modes are superposed as described earlier, and then, data are prepared in order to intermittently record superposed dots in the boundary area as shown in FIG. 27D and FIG. 27E. Also, when the printing mode is changed from high speed printing mode to high density printing mode, the process shifts to step S284 where data are prepared for the execution of recording to supplement dots in the boundary area as shown in FIG. 25. In accordance with the data thus prepared in the step S283 or step S284, printing is performed in step S286 through the process in step S285.

As described above, examples are shown each individually so as to determine whether or not a recording is intermitted in the printing mode changing boundary area on the basis of a recording medium or printing mode to be applied, but it may be possible to arrange a structure so that the preparation of interpolating data is determined for such boundary portion on the basis of both recording medium and printing mode.

Figure 26:
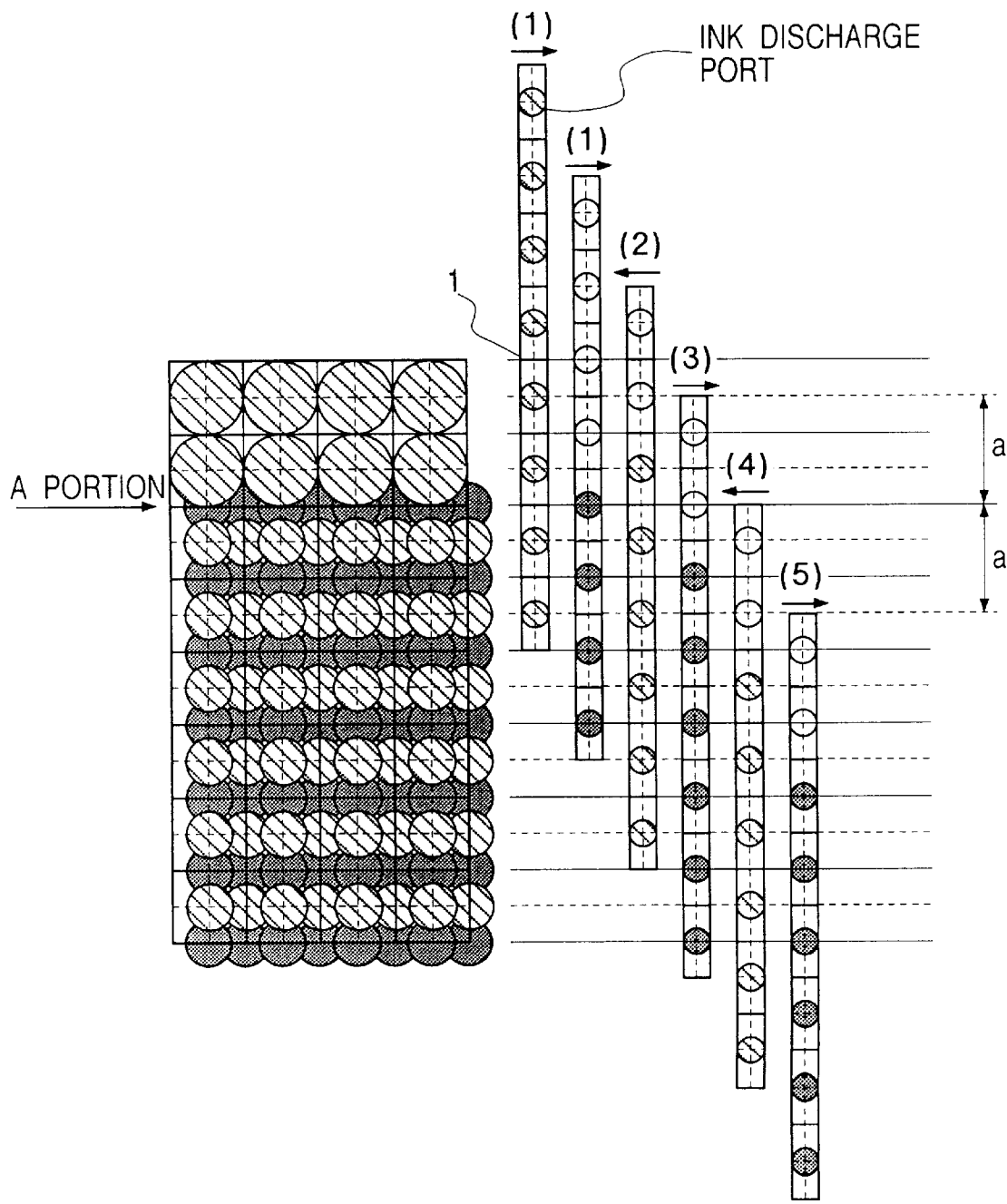

FIG. 26 shows a recording method in which the feed amount of a recording medium is made constant. The recorded image is the same as the image shown in FIG. 25. With the feed amount a for the recording medium, which is equal to 1.5 nozzle portion, multipass printing method is executed. Therefore, in accordance with the present embodiment, there is no possibility that two nozzles are used out of eight, that is, the total nozzles prepared for the print head. Those indicated by white circles in FIG. 26 are the array of ink discharge port that is not in use. With recording by the application of the present method, the feed amount of recording medium is made constant. As a result, it becomes easier to design the feeding system.

As described above, it is possible to prevent images from being degraded in the aforesaid mode changing portion by arranging additionally recording or removing dots in that portion or by changing the feed pitches of a recording medium.

Seventh Embodiment

Figure 29A:
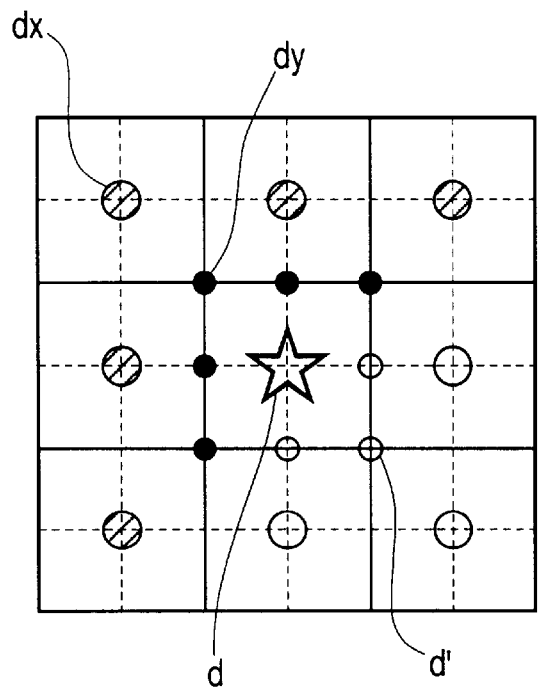
FIGS. 29A and 29B are views illustrating one embodiment in accordance with the present invention.

In the present embodiment, a method is provided to prevent images from being degraded when different kinds of images are to be mixedly present in one and the same luster. FIG. 29A shows lattice points in low resolution (360 dpi) with dotted vertical and horizontal lines. In FIG. 29A, the lattice points for a nine-pixel portion is represented by 360 dpi×360 dpi vertically and horizontally. A earmarked pixel d (central pixel in a lattice, which is indicated by an asterisk) is recorded in high density recording mode, and exemplifies a case where the transformation of small four dots is performed per large dot. In other words, dots d' indicated by small white circles are arranged in three locations, right, lower right, and directly below the dot d. Also, dots dx in FIG. 29A are those low resolution data (large dots) to be arranged on the low resolution lattice points described above. In FIG. 29A, five of such dots are arranged in total, above and left of the earmarked pixel d (three large white circles indicate portions having no image data). When a plurality of dots are recorded by different printing modes and are not adjacent to each other like this example, complementary dots dy are arranged on all the points where high resolution data (small dots) can be arranged in the adjacent portions to the earmarked pixel d and the adjacent high resolution data dx, which are recorded in different printing mode. In FIG. 29A, the dots dy indicated by small black circles are arranged in the same number as the dots dx each on the respective high resolution lattice point of 720 dpi.

Figure 29B:
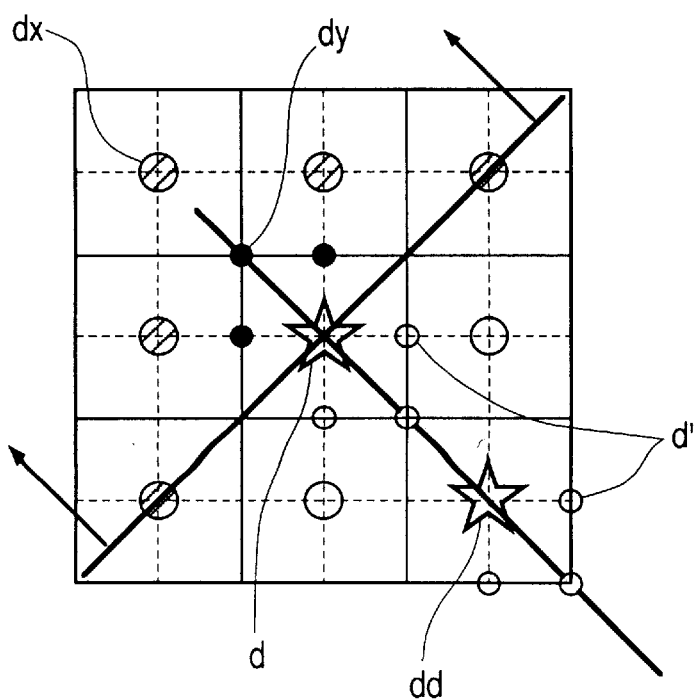

Now, as shown in FIG. 29B, if image data to be recorded in different printing modes are a plurality of dot arrays (not the numbers of dots in contact with each other), the dot arrangement is determined for the printing mode changing portion in consideration of the orientation of the aforesaid dot arrays (two dots indicated by asterisks in FIG. 29B). To the line connecting the centers of the two dots d and dd, which are high resolution data, (a solid line in the lower right in FIG. 29B), a perpendicular line is set to run through the currently earmarked pixel d. Then, on the boundaries of printing mode changing portions, which do not contain this perpendicular line, complementary dots dy are arranged. In FIG. 29B, three dots dy are arranged on the aforesaid boundary portions. In practice, the positions of such complementary dots are detected by a pattern matching or the like, for example. In FIG. 29B, there are eight such lines with respect to the earmarked pixel d. It should be good enough if only those lines are detected to determine whether or not the lines are agreeable with the circumference of a pixel currently earmarked.

Figure 30A:
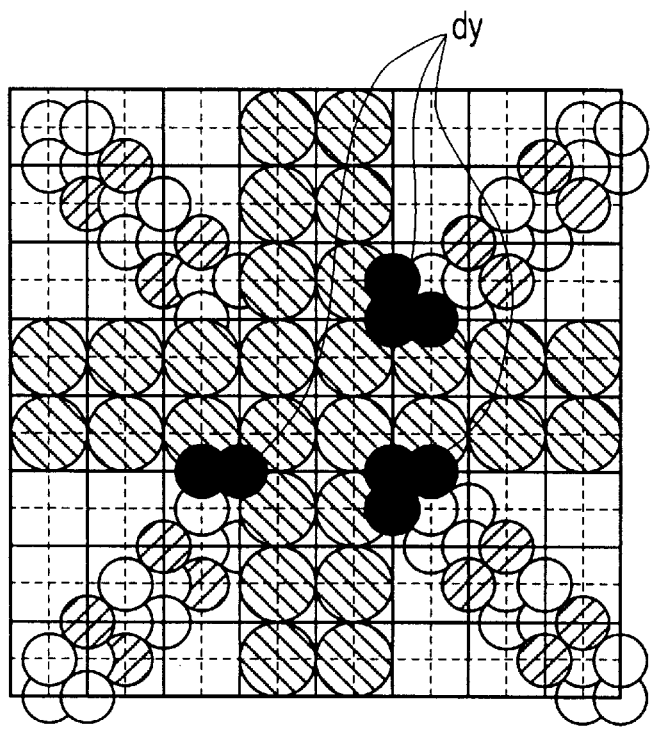
FIGS. 30A and 30B and FIGS. 31A to 31D are views showing the arrangement of recording dots in accordance with one embodiment of the present invention.
Figure 30B:
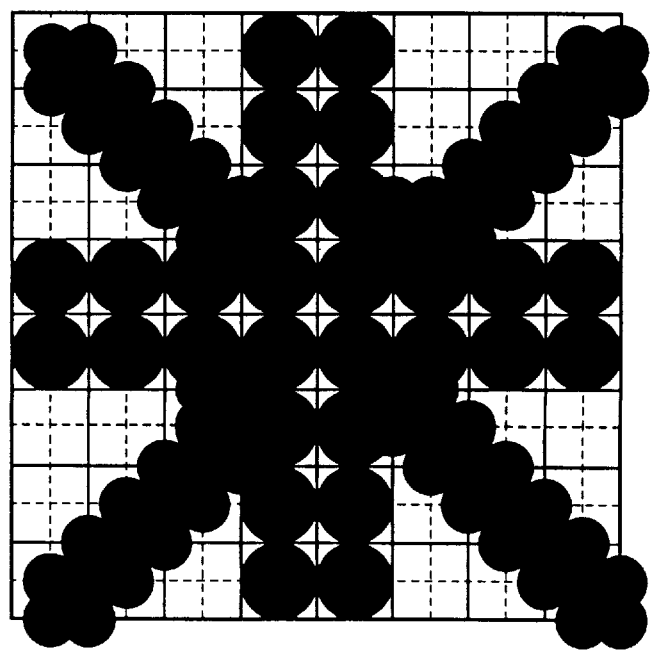

FIG. 30A shows the complementary dots recorded on the boundaries of printing mode changing portions by the method described above in one and the same luster. Those portions indicated by black circles are the complementary dot groups dy described in conjunction with FIGS. 29A and 29B. FIG. 30B is a view illustrating the condition of dot arrangement in such a manner as to make it easily observable. To compare with the condition shown in FIG. 36B, the effect of the complementary dots thus provided is easily recognizable.

Figure 36A:
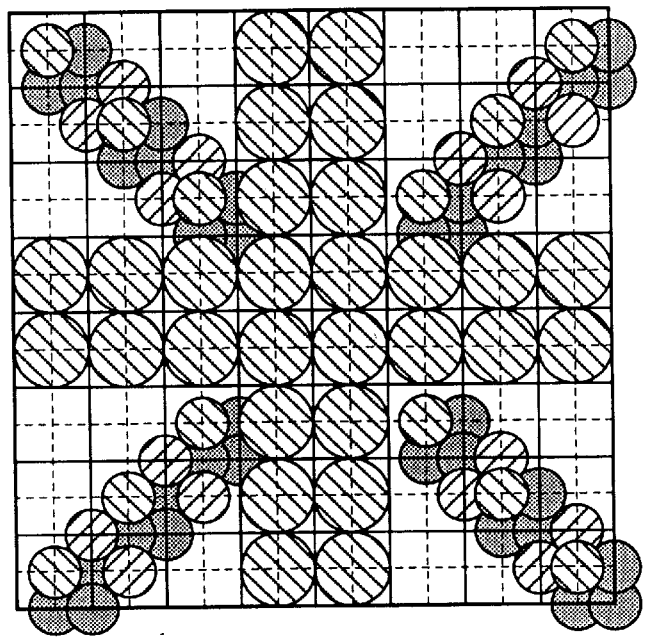
Figure 36B:
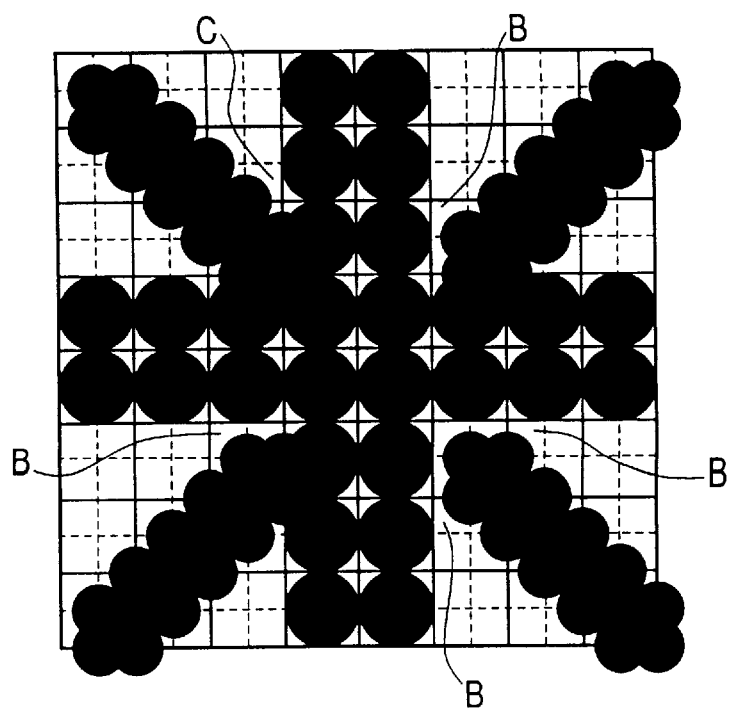

Also, as another method applicable to changing the recording conditions for image enhancement, it is possible to record the adjacent areas in different resolutions with large dots by changing the data formed by small dots either in the gap B created by the offset of the lattice points in the dot arrangement in the coupling portion between the large and small dots shown in FIGS. 36A and 36B or in the area C where density becomes particularly conspicuous, although it is confined extremely locally.

Eighth Embodiment

Now, the detailed description will be made of an eighth embodiment in accordance with the present invention.

Figure 31A:
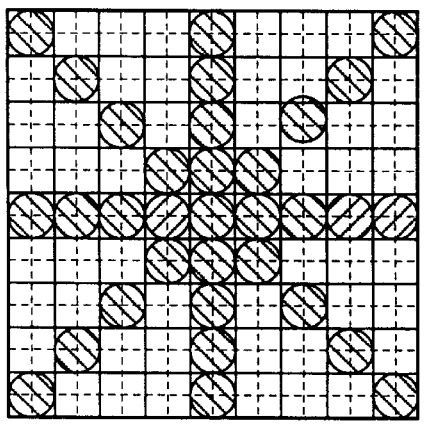

In the present embodiment, it is possible to efficiently execute printing by making dot arrangements different at the time of high density recording mode by changing the kinds of printing modes such as represented by the discharging frequency of the print head or the scanning speed of the carriage, which travels with the print head being mounted on it. When low resolution data are printed in high density recording mode as shown in FIG. 31A, the arrangement of recording data varies depending on the factors of performance, such as the structure of print head, the frequency of ink discharge, and the like. In other words, since there is a limit to the ink discharging frequency, the continuous arrangement of ink droplets (particularly in the main scanning direction) is automatically limited when high density recording is executed. When using the print head shown in FIG. 6B, the dot arrangement is effectuated continuously by lowering the scanning speed of the carriage in the main scanning direction. This results in making the printing speed slower to that extent. Therefore, a method is adopted to arrange the dots in such a manner that an arrangement is made for the high resolution recording to keep its discharging frequency not to be more than that applicable to low resolution recording, and then, this recording is positioned half pixel offset in the sub-scanning direction as shown in FIG. 6B. With this dot arrangement, the frequency of ink discharge in the main scanning direction becomes the same as that of low resolution recording even if recording is executed in high resolution. As a result, it is possible to execute printing without making the carriage speed slower.

Figure 31B:
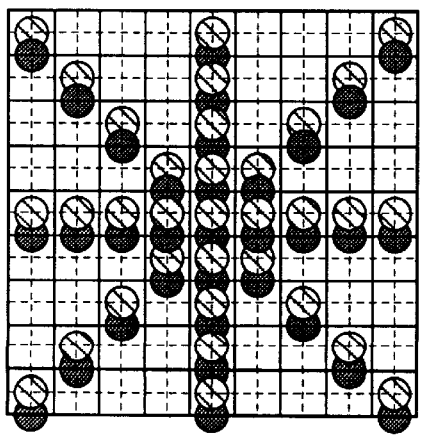
Figure 31C:
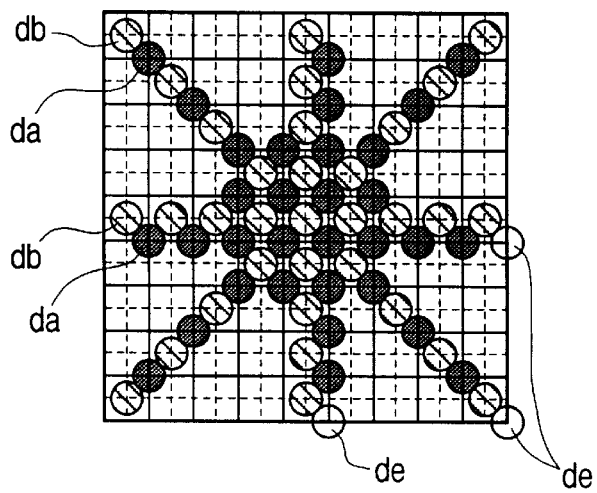
Figure 31D:
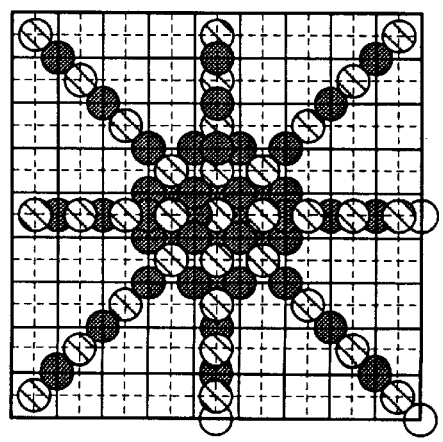

Also, FIG. 31C shows an example in which the dot positions are changed depending on the situation of adjacent pixels in order to improve the image quality of the component indicated by slanted lines in FIG. 31B. This embodiment arranges the currently remarked pixel as dots recorded on the lattice points in low resolution (indicated by circles db filled in slanted lines in FIG. 31C), and then, only when image data are present on the lattice points in low resolution in the diagonal direction, dots da (represented by gray circles) are arranged in the direction where image data exist. If no adjacent pixels are present in the diagonal direction, dots da are arranged in the lower right section. Also, in the single portion of the continuous image, no complementary dots are arranged as those de in FIG. 31C which are transformed into dots in high resolution. As described above, complementary pixels in high resolution are arranged only in the diagonal direction with respect to the lattice points in low resolution. In this way, it is possible to execute printing in the main scanning direction without raising ink discharging frequency. Now, the description will be made of recording shown in FIG. 31D. This example is to show a high image quality preference printing mode. Therefore, the carriage speed is reduced to approximately a half the speed applicable to low resolution printing so that the ink discharging frequency is not caused to exceed the upper limit of the print head. Also, high resolution recording is executed in the main scanning direction. In an image quality preference printing mode of the kind, the dot arrangement is made to record dots da and dots db continuously in high resolution in the main scanning direction.

Now, if a print head is independently arranged with an offsetting of half pixel portion in the sub-scanning direction as shown in FIG. 6A (=pixel portion of recording density a in high resolution), it is possible to print dots da (represented by gray circles) shown in FIGS. 31A to 31D by the application of one and the same scanning, although in a monochromic color. By use of such print head capable of performing recording both in high speed and high image quality, it is possible to print dots da in FIG. 31B and FIG. 31C together with dots db by the application of one and the same scanning. In this respect, the same reference marks in FIGS. 31A to 31D are arranged with the same hatching patterns.

As described above, it is possible to efficiently execute image recording by making the dot arrangement different for high resolution data in accordance with the factors showing difference in printing modes, such as the difference in ink discharging frequency, the carriage scanning speed, the structure of print head, or the like.

Ninth Embodiment

Figure 32A:
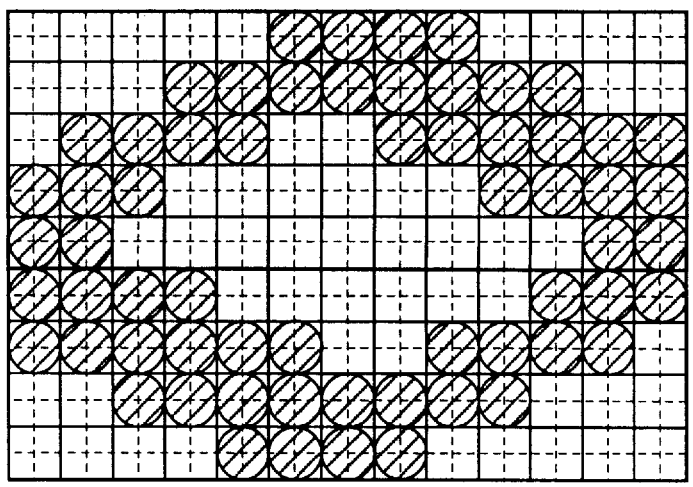
FIGS. 32A to 32C are views which shows a conventionally known superposed printing.
Figure 32B:
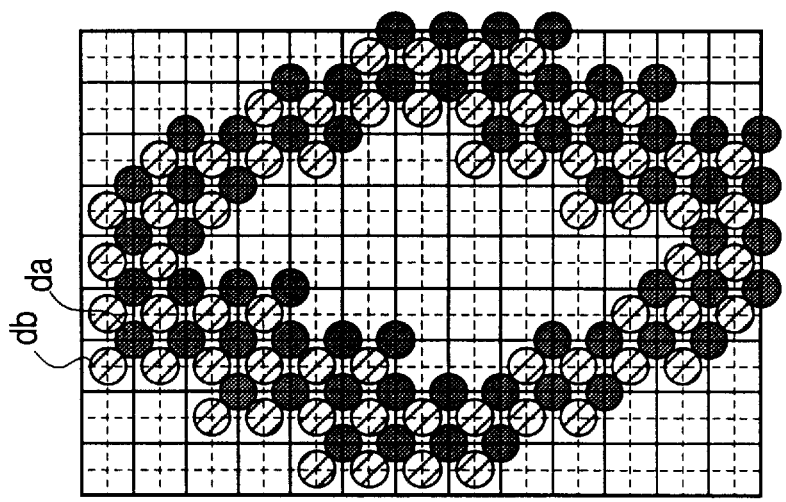
Figure 32C:
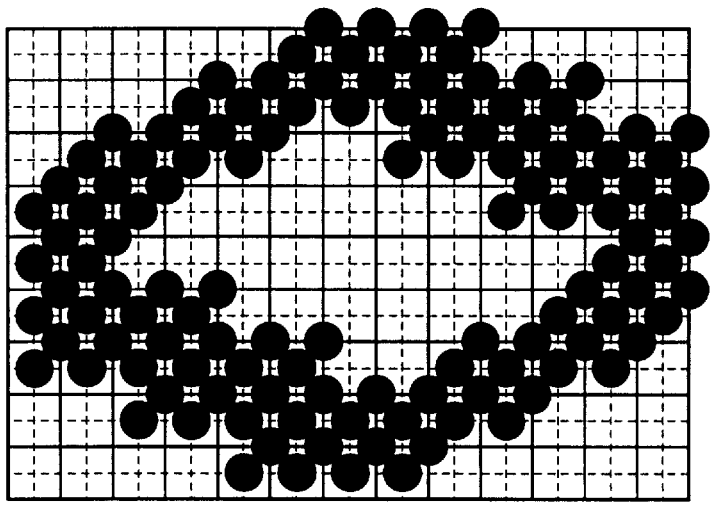
Figure 33C:
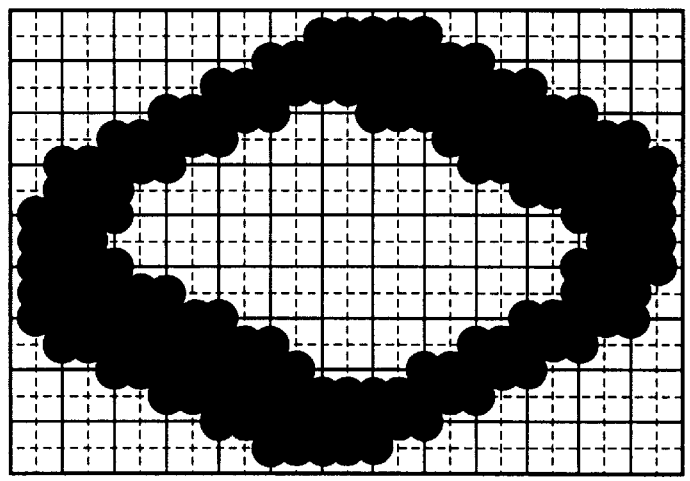
FIGS. 33A to 33C and FIGS. 34A to 34C are views showing the arrangement of recording dots in accordance with one embodiment of the present invention.
Figure 33B:
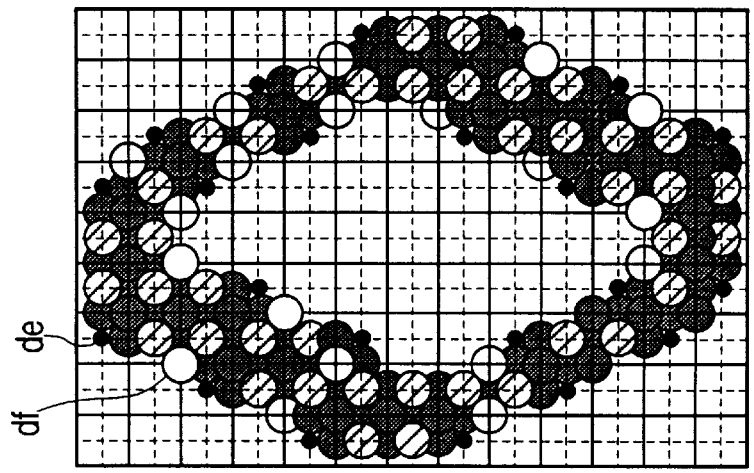
Figure 33A:
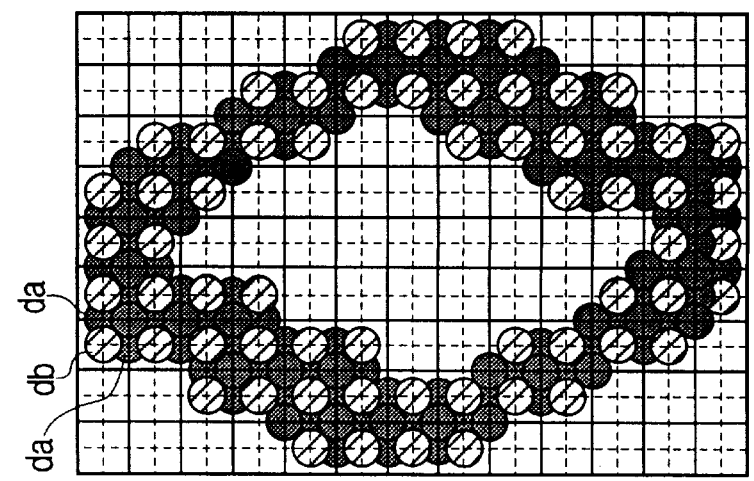

The present embodiment makes it possible to attain the enhancement of printing quality of a superposed printing in which one and the same image data are printed in plural times in one and the same pixel in order to enhance printing density. When low resolution data shown in FIG. 32A are superposed in a print, the printing data to be arranged per unit pixel in low resolution are made twice as much according to the present embodiment. In this case, four small dots are arranged per unit lattice with the transformation of the high resolution data. (Usually, a large dot in low resolution is recorded by two small dots in high resolution as shown in FIG. 32B.) As described above, dots are arranged in a quantity two times the usual amount of ink to be impacted, and transformed into those in high resolution to form the contour and corners of an image in high resolution. FIG. 33A shows dots db (original data) arranged on the lattice points in low resolution, and dots da arranged to increase the ink impacting amount. Here, in FIG. 33A, because dots da are not arranged in the vicinity of the location where no dots db on the lattice points are arranged close to each other, the arranged dots are not necessarily twice as much exactly. In the next step, the corners of the image data are corrected to modify the contour thereof. While attention is given only to dots db on the lattice points as shown in FIG. 33B, dots df (white circles) are added to the L-lettered corner, and dots de (small black circles) at the corner portion are removed. Before removing the dots de, dots df are added. For the intended addition of the dot df, decision is made by an OR execution after the high resolution transformation and additional sequence are processed. Therefore, the dot arrangement is determined by detecting either one of these factors. There is no need for superposing dots df on the print in one and the same position. As described above, the dots are arranged to increase the ink impacting amount per unit pixel when high resolution data are transformed. After this process, smoothing or other treatment is provided before effectuating the superposed impact for the enhancement of density as shown in FIG. 33C. In this way, there is no possibility that any image degradation occurs in the edge portions of the image. From comparison with the representation in FIG. 32C, the effects of this process is clearly noticeable.

Figure 34C:
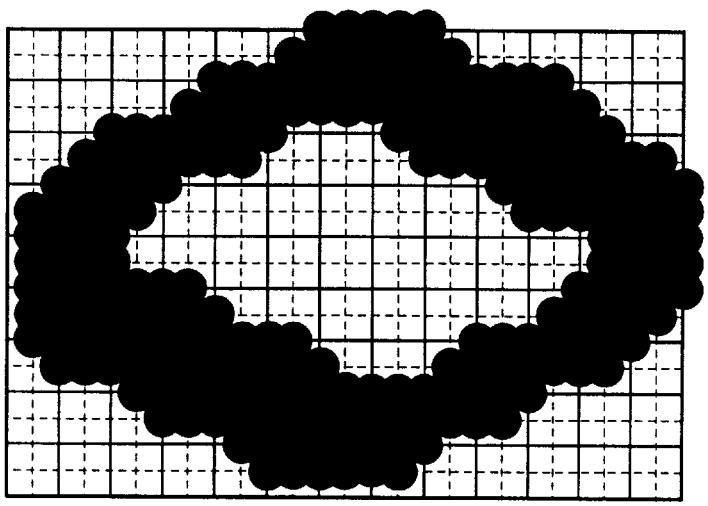
Figure 34B:
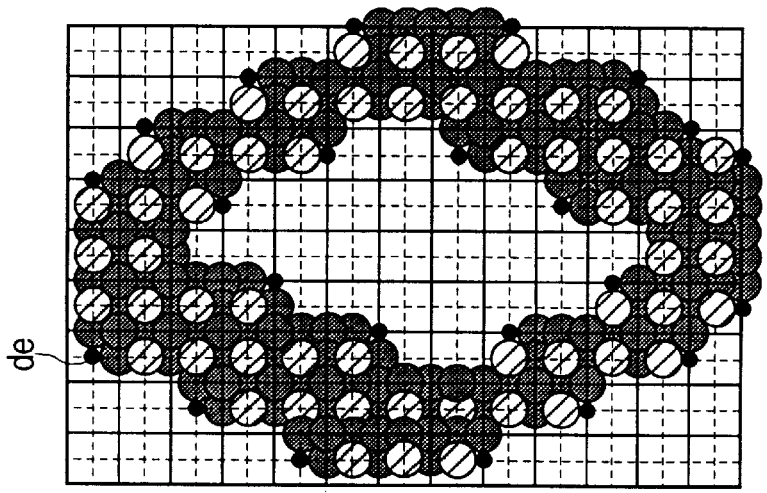
Figure 34A:
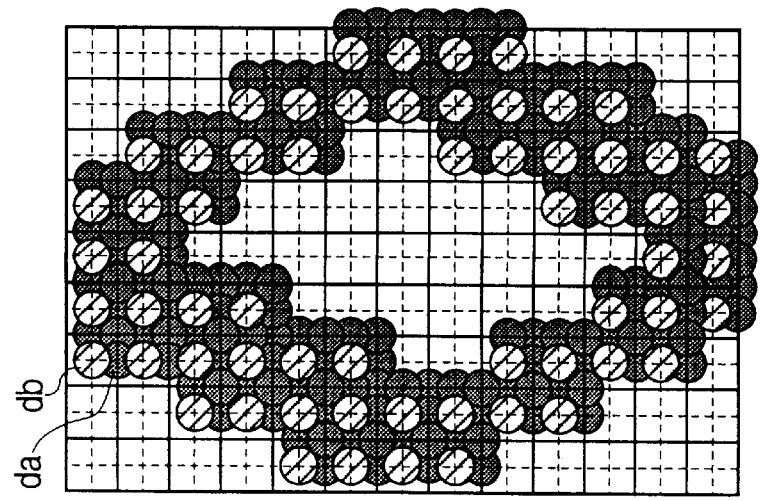

Also, FIGS. 34A to 34C show an example in which a smoothing process (FIG. 34B) is executed after arranging four small dots in high resolution per large dot in low resolution. When transformed into the dots in high resolution, supplementary dots are all arranged. Therefore, it is good enough if only the dots de are removed in executing the smoothing process. Although corner portions are still conspicuous as compared with the example shown in FIGS. 33A to 33C, there is a significant advantage that it is possible to execute the smoothing process simply just by removing the dots.

Figure 37:
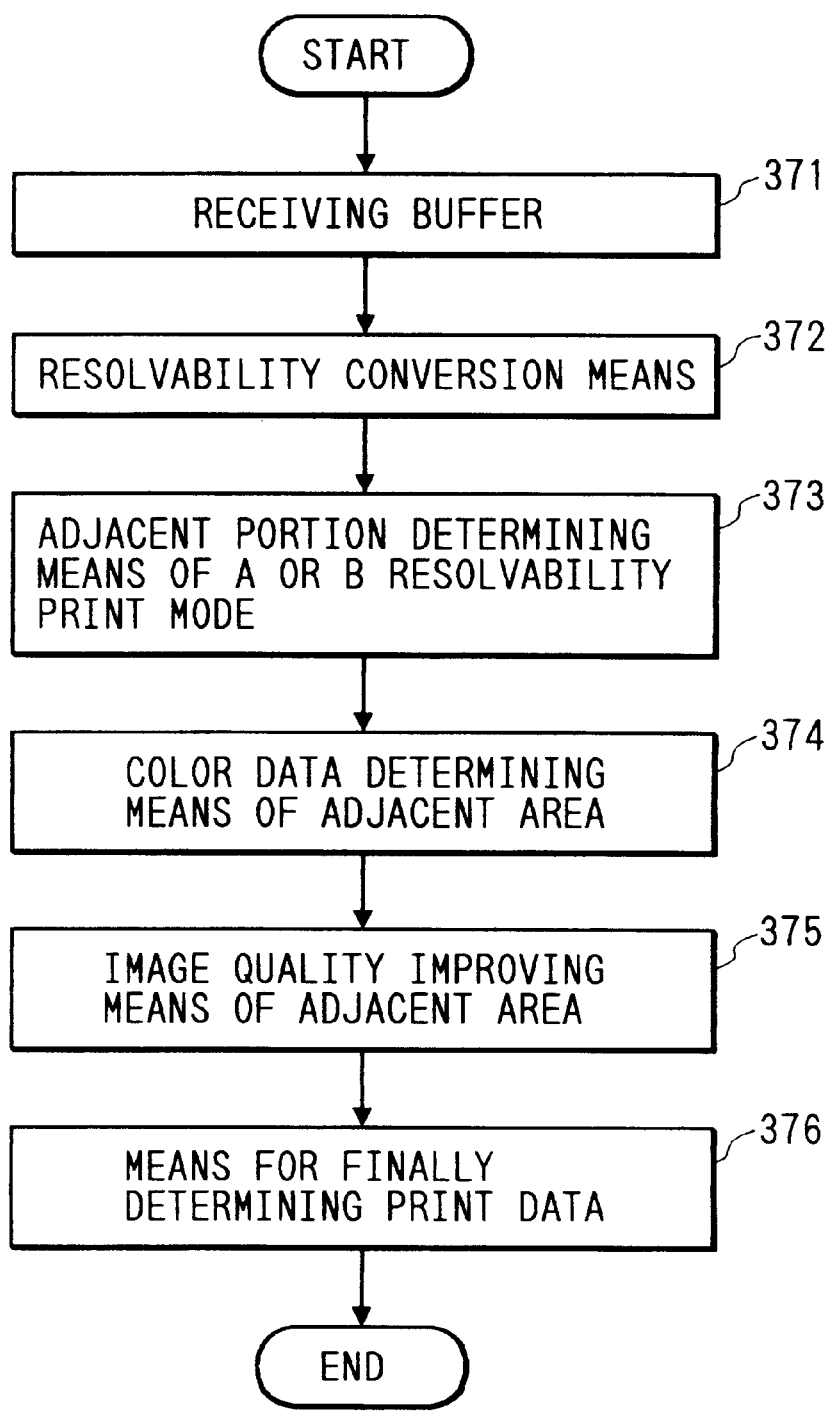
FIG. 37 is a block diagram which shows the function of one embodiment in accordance with the present invention.

Now, FIG. 37 is a block diagram showing the features of the present invention.

In FIG. 37, when reception buffer 371 receives data, the resolution transformation of the recording data is executed by means 372 for transforming resolutions. Here, the numbers and positions of dots are uniformly developed from the data on the source image. Then, the boundary section, which forms the resolution changing portion, is detected by means 373 for determining the adjacent portions of printing mode in A or B resolution. Here, it is determined whether or not any adjacent area exist in different resolution mode, A or B. Further, on the basis of resolutions, printing modes, recording media, recording data, selected print heads, or other setting conditions of recording means, it is determined in which pixels the ink impacting amount is increased or decreased. Then, using means 374 for determining color data on the adjacent areas, color data in the adjacent areas are detected. In this color data determination, the color of printing mode in A resolution, the color of printing mode in B resolution, the color of background portion, and other color data in the adjacent areas are examined.

Subsequently, by means 375 for enhancing image quality in the adjacent areas, decision is made as to the recording data (color, ink impacting amount, printing mode, and the like) to be recorded actually in the adjacent areas. If the adjacent colors themselves are found to be those having only the same color, the printing dots are determined in accordance with the recording medium to be used before and after resolutions are transformed. Then, the enhancement of image quality is executed by adding or reducing dots before and after the transformation of resolutions. In the previous embodiment, a case is shown in which an excellent image quality is obtained because ink does not run on a recording medium, but in an ordinary sheet on which ink tends to be blurred, excessively densified areas tend to occur rather frequently. Therefore, consideration should be given to ink blurring rather than the provision of supplementary ink dots as described earlier. Consequently, in some cases, it is more preferable to intermit ink dots in high resolution or in low resolution as the case may be. If the adjacent colors themselves are only different monochromic colors (one single color each), the respective color in the printing mode area in each resolution is added to or removed from the respective area. Also, if multiple color data or background color exists in the adjacent colors, the transformation should be executed so that color alteration is made smaller. Through these steps, printing data are established by means 376 for defining printing data. Subsequently, the process shifts to the recording operation.

The principal part of the embodiment described above becomes clearer by reference to FIG. 37. In any case, for an ink jet recording apparatus capable of recording in different resolutions, which has never been recognized or suggested up to the present, this invention makes it possible to reliably prevent the change of resolutions from causing defects in the ink images to be recorded by use of such ink jet recording apparatus. With the present invention, therefore, it is possible to perform various kinds of high quality recording (including textile print and other prints collectively).

Also, in the processing steps described with reference to FIG. 37, each of corresponding means (371 to 376) has been explained as those being installed individually, but it may be possible to arrange a CPU or other computing means to deal with each process so that the procedures are executed in order of the processing steps as shown in FIG. 37.

Other Embodiments

In each of the embodiments described above, the present invention has been explained by exemplifying an ink jet recording apparatus shown in FIG. 7. Also, an ink jet recording apparatus shown in FIGS. 18A to 18C are provided with piezoelectric elements used for electromechanical transducing means serving as means for discharging ink as described earlier. However, the present invention is not necessarily limited to the use of the aforesaid recording apparatuses. It is applicable to a wider use of recording apparatuses. Now, the description will be made supplementarily of the structure of recording apparatuses to which the present invention is suitably applicable.

FIG. 1 is a perspective view which shows an ink jet recording apparatus of a type that discharges ink by means of electrothermal transducing elements. This is another example to which the present invention is suitably applicable. Here, a recording medium 106 is inserted into the sheet feeding position of the recording apparatus 100, and then, fed by means of feed roller 109 to a recordable area of a recording head unit 103. On the lower part of the recording medium in the recordable area, a metallic platen 108 is installed. A carriage 101 is structured to travel in the specific direction along two guide shafts 104 and 105. The carriage reciprocates to scan the recording area. On the carriage 101, there are installed an ink tank to supply four colors of ink and a recording head unit 103 including the recording heads to discharge those colors of ink. The four colors of ink used by the ink jet recording apparatus of the present embodiment are: black (Bk), Cyan (C), magenta (M), yellow (Y). In this respect, a reference numeral 107 designates switches and a display panel to enable various recording modes to be set and the current status of the recording apparatus to be displayed as well.

Figure 2:
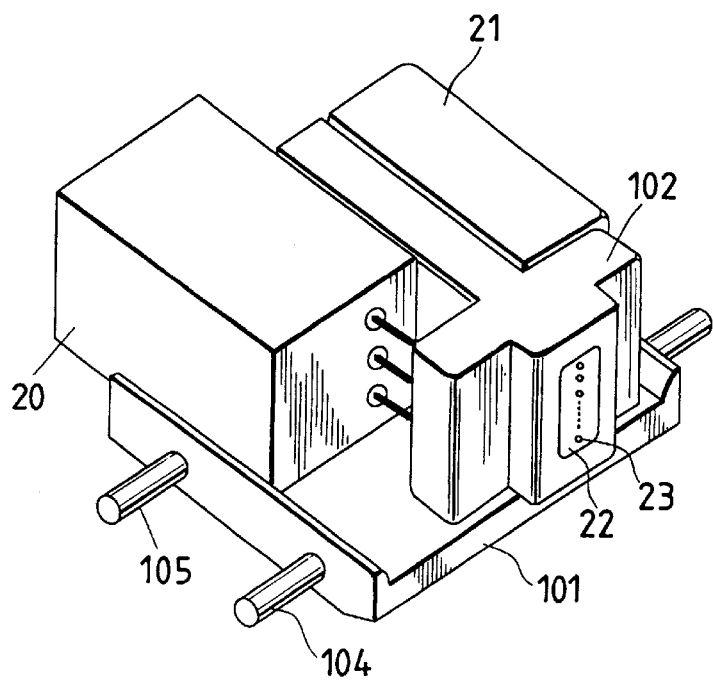
FIG. 2 is a perspective view which shows the recording head unit of the ink jet recording apparatus represented in FIG. 1.

FIG. 2 is a perspective view which shows the recording head unit. A black ink tank 21 for retaining black ink, and a color ink tank 20, which retains the other three colors integrally, are coupled to the recording head 102 by means of respective pipes. Ink from each tank is supplied to the recording head 102. On the discharge port surface 22, there is arranged discharge port array 23 comprising a plurality of discharge ports corresponding to each color of Bk, C, M, and Y. The number of discharge ports for each color is 32. The pitches between each of 32 discharge ports are arranged linearly for the respective colors with a density of 360 dpi so that the dot pitches are made approximately 70 $\mu$m. Also, the discharge port arrays for the respective colors are arranged each with a gap of eight-dot pitch portion. Also, the discharge ports for each color are arranged to record in Bk, C, M, and Y in that order.

The ink jet recording apparatus of the present embodiment is provided with electrothermal transducing elements arranged corresponding to the respective ink paths (nozzles). For this ink jet recording apparatus, the so-called bubble jet recording method is adopted to discharge ink from the nozzles when driving signals are applied to the electrothermal transducing elements in accordance with recording information.

Figure 3:
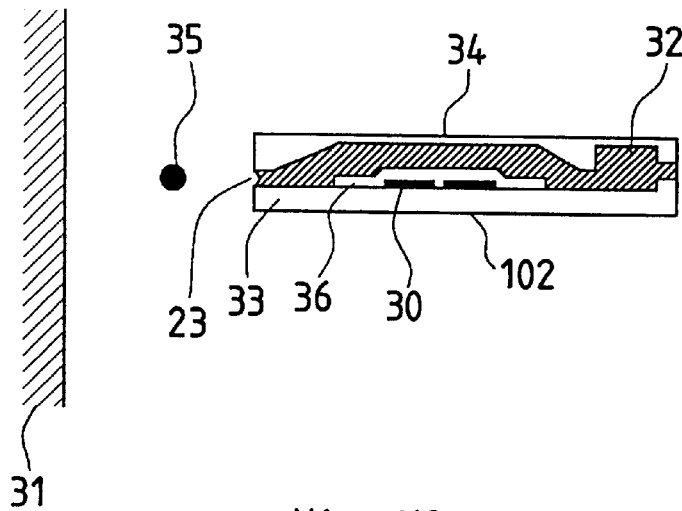
FIG. 3 is an enlarged cross-sectional view which shows the recording head of the recording head unit represented in FIG. 2.
Figure 4:
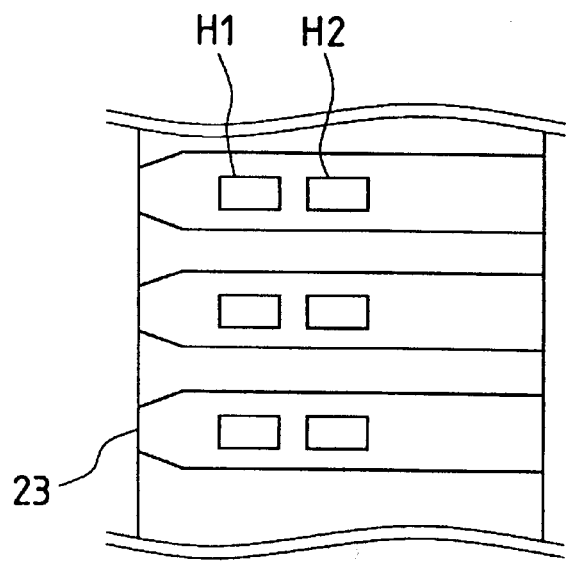
FIG. 4 is an enlarged cross-sectional view which shows the arrangement of heaters serving as discharging means of a recording head.

FIG. 3 is an enlarged cross-sectional view showing the vicinity of the electrothermal transducing elements of the recording head. FIG. 4 is an enlarged front view showing the vicinity of the electrothermal transducing elements of the recording head.

The heat generating elements 30, which are the electrothermal transducing elements of the recording head, are provided each with two heat generating bodies H1 and H2 structured to generate heat independently with respect to each of the entire nozzles as shown in FIG. 4.

When recording in usual low resolution, this apparatus executes recording in recording density of 360 dpi. In this case, the heat generating bodies H1 and H2, which are arranged corresponding to each discharge port, are caused to generate heat simultaneously for discharging ink. Ink in each nozzle is rapidly heated by the heat generating bodies H1 and H2 to form air bubbles by its film boiling. By the pressure exerted by the air bubble thus developed, ink droplets 35 shown in FIG. 3 are discharged toward a recording medium 31 one after another, thus forming characters or images on the recording medium. In this case, the amount of ink droplet in each color is approximately 40 ng.

In contrast, when recording in high density, a control is exercised so that only the heat generating body H1 of each nozzle is caused to generate heat. As a result, the amount of ink droplet to be discharged in each color is approximately 20 ng, which is smaller than the amount in recording in low resolution.

As described above, using the recording head capable of discharging ink of different volumes from the same nozzle, recording is performed in high resolution by the application of only small volume of ink. In order to obtain discharges in different volumes of ink, there is a method other than the one in which two electrothermal transducing elements are used for each nozzle. For example, the power that is supplied to the electrothermal transducing elements may be controlled when discharging ink or the temperature of ink may be controlled. To the present invention, both of them are equally applicable.

For each of the discharge ports 23, ink paths are arranged to conductively connect them with the discharge ports. A common ink chamber is installed behind the portion where these ink paths are arranged.

In each of the ink paths for the respective discharge ports, heat generating bodies 30 (H1 and H2 shown in FIG. 4), which are electrothermal transducing elements, are provided to generate thermal energy to be utilized for discharging ink droplets from the discharge ports, and also, electrode wiring is arranged to supply electric power to each of these bodies. These heat generating bodies 30 and electrode wiring are formed on a base board 33 made of silicon and others by the application of film formation technologies. On the heat generating bodies, a protective film 36 is formed to prevent ink and the heat generating bodies from being directly in contact with each other. Further, on the base board, partition wall 34, which is formed by resin or glass material, is laminated in order to provide the discharge ports, the ink liquid paths, the common liquid chamber, and some others.

The recording head, which uses electrothermal transducing elements thus provided, is commonly called a bubble jet recording head because this head utilizes air bubbles formed by the application of thermal energy for discharging ink droplets.

Of the ink jet recording apparatuses, the present invention demonstrates particularly excellent effects when applied to a recording apparatus provided with recording head using ink jet method in which flying droplets are formed by utilization of thermal energy for its execution of recording.

Regarding the typical structure and operational principle of such method, it is preferable to adopt those which can be implemented using the fundamental principle disclosed in the specifications of U.S. Pat. Nos. 4,723,129 and 4,740,796. This method is applicable to the so-called on-demand type recording system and a continuous type recording system as well. Particularly, however, the method is suitable for the on-demand type because the principle is such that at least one driving signal, which provides a rapid temperature rise beyond a departure from nucleation boiling point in response to recording information, is applicable to an electrothermal transducer disposed on a liquid (ink) retaining sheet or liquid passage whereby to cause the electrothermal transducer to generate thermal energy to produce film boiling on the thermoactive portion of recording means (recording head), thus effectively leading to the resultant formation of a bubble in the recording liquid (ink) one to one for each of the driving signals. By the development and contraction of the bubble, the liquid (ink) is discharged through a discharging port to produce at least one droplet. The driving signal is more preferably in the form of pulses because the development and contraction of the bubble can be effectuated instantaneously, and, therefore, the liquid (ink) is discharged with quick response. The driving signal in the form of pulses is preferably such as disclosed in the specifications of U.S. Pat. Nos. 4,463,359 and 4,345,262. In this respect, the temperature increasing rate of the heating surface is preferably such as disclosed in the specification of U.S. Pat. No. 4,313,124 for an excellent recording in a better condition.

The structure of the recording head may be as shown in each of the above-mentioned specifications wherein the structure is arranged to combine the discharging ports, liquid passages, and the electrothermal transducers (linear type liquid passages or right-angled liquid passages). Besides, the structure such as disclosed in the specifications of U.S. Pat. Nos. 4,558,333 and 4,459,600 wherein the thermal activation portions are arranged in a curved area is also included in the present invention. In addition, the present invention is effectively applicable to the structure disclosed in Japanese Patent Laid-Open Application No. 59-123670 wherein a common slit is used as the discharging ports for plural electrothermal transducers, and to the structure disclosed in Japanese Patent Laid-Open Application No. 59-138461 wherein an aperture for absorbing pressure wave of the thermal energy is formed corresponding to the discharge ports. In other words, in accordance with the present invention, it is possible to perform recording reliably and efficiently irrespective of the modes of recording head.

Further, the present invention is effectively applicable to a recording head of full-line type having a length corresponding to the maximum width of a recording medium recordable by the recording apparatus. For such recording head, it may be possible to adopt either a structure whereby to satisfy the required length by combining a plurality of recording heads or a structure arranged by one recording head integrally formed.

In addition, the present invention is effectively applicable to a recording apparatus of serial type exemplified above, irrespective of whether using the recording head fixed to the apparatus main body; the recording head of an exchangeable chip type, which can be electrically connected with the apparatus main body or to which ink can be supplied from the apparatus main body when it is installed in the apparatus main body, or using the recording head of a cartridge type in which an ink tank is formed integrally with the recording head itself.

Also, for the present invention, it is preferable to additionally provide a recording head with recovery means and preliminarily auxiliary means as constituents of the recording apparatus because these additional means will contribute to enabling the effectiveness of the present invention to be more stabilized. To name them specifically, these are capping means for the recording head, cleaning means, suction recovery means as described above, and in addition, recovery means by use of compression, preheating means such as electrothermal transducers or heating elements other than such transducers or the combination of those types of elements. The adoption of a predischarge mode, which performs discharging other than the regular discharge, is also contributable to executing a stabilized recording.

Also, for the kinds and numbers of mounted recording heads, it is possible, as described earlier, to provide two or more heads for plural kinds of ink having different colors or densities. In other words, the present invention is extremely effective in applying them not only to a recording mode in which only main color such as black is used, but also to an apparatus having at least one of multi-color modes with ink of different colors, or a full-color mode using the mixture of the colors, irrespective of whether the recording heads are integrally structured or it is structured by a combination of plural recording heads.

Moreover, in the embodiments of the present invention described above, while the ink has been described as liquid, it may be an ink material which is solidified below the room temperature but liquefied at the room temperature. Since the ink is controlled within the temperature not lower than 30° C. and not higher than 70° C. to stabilize its viscosity for the provision of the stable discharge in general, the ink may be such as to be liquefied when the applicable recording signals are given. In addition, while positively preventing the temperature from rising due to the thermal energy by the use of such energy as an energy to be consumed for changing states of ink from solid to liquid, or by use of the ink which will be solidified when left intact for the purpose of preventing the ink from being evaporated, it may be possible to adopt for the present invention the use of an ink having a nature of being liquefied only by the application of thermal energy, such as an ink capable of being discharged as ink liquid by enabling itself to be liquefied anyway when the thermal energy is given in accordance with recording signals, and an ink which will have already begun solidifying itself by the time it reaches a recording medium. In such a case, it may be possible to retain ink in the form of liquid or solid in the recesses or through holes of a porous sheet such as disclosed in Japanese Patent Laid-Open Application No. 54-56847 or No. 60-71260 in order to enable the ink to face the electrothermal transducers.

In the present invention, the most effective method for the various kinds of ink mentioned above is the one capable of implementing the film boiling method as described above.

Further, as the mode of the recording apparatus in accordance with the present invention, it may be possible to adopt a copying apparatus combined with a reader in addition to the image output terminal for a computer, or other information processing apparatus, and also, it may be possible to adopt a mode of a facsimile apparatus having transmitting and receiving functions.

As described above, using the diameter of ink droplets (dot diameter) of a size different from that of low resolution (=pitches of ink discharge ports) of a print head, it is possible to materialize high density recording mode in high resolution and high speed printing mode in low resolution, thereby to attain high speed image recording. Also, using large dots in place of small dots, it is possible to reduce the driving frequency of print head, thus increasing the recordable numbers of recording medium (that is, making the life of the recording apparatus longer).

Also, for the dot arrangement where different resolutions (large and small dots) are mixedly present, the present invention makes it possible to eliminate the displacement of images resulting from different resolutions by offsetting the positional relation between the large and small dots by unit of ¼ pitch of ink discharge ports in the main scanning direction or sub-scanning direction or in both directions.

Also, it is possible to enhance the image density by utilizing the fact that the lattice points in the dot arrangement become different if resolutions made different, while taking the advantages of high density recording as it is.

In the embodiments described above, it is arranged to separate the scan for the image formation by discharging large ink droplets and the scan for image formation by discharging small ink droplets so that images to be recorded in low and high resolutions are able to be mixedly present. Since scanning is separated into plural ones, it is made possible to execute stable discharges with almost no disturbance when ink flows in, which tends to take place usually at the time of discharging ink in different amounts of discharge.

In this respect, while the description has been made of low resolution as 360 dpi while high resolution as 720 dpi, the present invention is not limited thereto. For example, the combination of 300 dpi and 600 dpi or that of 400 k dpi and 800 dpi is adoptable. The same effects of the present invention are obtainable. It is also effective to adopt the ratio between large and small ink droplets or amounts of discharge themselves other than those described in the embodiments. As to the printing method, the description has been made of the bidirectional method, but the present invention is also effective to the printing scan only in one direction. Also, it has been described that the printing mode switching is executed in accordance with the kinds of images to be recorded while the black image is defined to be printed in high density, but it may be possible to make arrangement so that color image is used for high density recording depending on the objectives of image output. In other words, depending on the objectives, determination criteria may change, but the effects of the present invention themselves do not change.

Also, the recording method of the present invention is applicable to the enhancement of gradation reproducibility by use of multi-valued recording or it is possible to anticipate the same effects by using appropriately large or small dots for a method for recording in dark and bright ink, which uses ink of different densities.

In this respect, the relative low and high resolutions have been described as 360 dpi and 720 dpi in the embodiments, but the present invention is not limited thereto. The combination can be 300 dpi and 600 dpi or 400 dpi and 800 dpi for obtaining the same effects of the invention, for example. It is also possible to effectively adopt the ratio between large and small ink droplets or the amounts of discharge themselves can be other than those described in the embodiments.

As printing method, bidirectional printing has been described, but the present invention is also effective to the printing scan in one direction. Also, the description has been made of the black image as being printed in high density when changing printing modes by the kinds of images to be recorded, but it may be possible to use color image for high density recording depending on the objectives of image output. In other words, the determination criteria may change, but the effects of the present invention themselves do not change.

It is possible for the present invention to solve the new problems concerning the area where image is missing or density is excessively emphasized in ink images, which is created along the changes of different resolutions. It is also possible to prevent disturbances from being uniformly caused in the imaging area in which images of different resolutions continue or images of different resolutions mixedly exist.

What is claimed is:

1. An ink jet recording apparatus provided with means for discharging ink to form images on a recording medium, comprising:

means for controlling a discharge amount to control an amount of ink droplets to be discharged from said means for discharging; and means for controlling recording to form images by changing the amount of ink droplets to be discharged in accordance with said means for controlling the discharge amount in accordance with the kinds of images to be recorded, and for determining whether recording image data includes image data having a low resolution or image data having a high resolution, and correspondingly changing the amount of ink droplets to be discharged for the formation of images.

2. An ink jet recording apparatus according to claim 1, wherein said means for controlling recording determines whether or not recording image is characters, and changes the amount of ink droplets to be discharged for the formation of images.

3. An ink jet recording apparatus according to claim 1, wherein said means for controlling recording determines whether the recorded image is a black image or a color image, and changes the amount of ink droplets to be discharged for the formation of images.

4. An ink jet recording apparatus according to claim 1, wherein said means for controlling recording changes the amount of ink droplets to be discharged for the formation of images depending on whether or not recording image data contain the high resolution data changeable to low resolution data.

5. An ink jet recording apparatus according to claim 1, wherein said means for controlling recording forms images by changing said amount of ink droplets to be discharged by recording per unit page.

6. An ink jet recording apparatus according to claim 1, wherein said means for controlling recording forms images by changing said amount of ink droplets to be discharged when kinds of images to be recorded are changed.

7. An ink jet recording apparatus according to claim 1, further comprising means for setting printing mode, wherein said means for controlling recording forms images by changing said amount of ink droplets to be discharged in accordance with said printing mode.

8. An ink jet recording apparatus according to claim 1, wherein said means for discharging are thermal energy transducing elements to generate thermal energy.

9. An ink jet recording method for forming images by discharging ink on a recording medium by means for discharging ink, comprising the following steps of:

determining whether recording image data includes image data having a low resolution or image data having a high resolution; and forming images by changing an amount of ink droplets to be discharged from said means for discharging ink.

10. an ink jet recording method according to claim 9, wherein said determining step determines whether or not recording image data is characters.

11. An ink jet recording method according to claim 9, wherein said determining step determines whether recording image is black image or color image.

12. An ink jet recording method according to claim 9, wherein said determining step determines whether or not recording image data contains high resolution data changeable to low resolution data.

13. An ink jet recording method according to claim 9, wherein said means for discharging ink are thermal energy transducing elements to discharge ink by applying thermal energy ink.

14. An ink jet recording apparatus having means for controlling recording with respect to at least two kinds of recording densities in high resolution and low resolution, and being capable of discharging ink droplets in different sizes corresponding to each of the resolutions, comprising:

controlling means capable of discharging said ink droplets in different sizes on a recording medium in a recording density N times (N being an integer of 2 or more) a recording density in low resolution.

15. An ink jet recording apparatus having means for controlling recording with respect to at least two kinds of recording densities in high resolution and low resolution, and being capable of discharging ink droplets in different sizes corresponding to each of the resolutions, comprising:

controlling means for executing recording scans by a print head separately per recording in different resolutions.

16. An ink jet recording apparatus provided with discharging means to discharge ink for the formation of images by discharging ink on a recording medium, comprising:

means for controlling an amount of discharge to control an amount of ink droplets to be discharged from said discharging means; and means for controlling superposed printing to arrange ink droplets on one and the same position on the recording medium by separately superposing plural droplets, wherein said means for controlling superposed printing separates ink droplets in different discharging amounts in plural numbers by said means for controlling an amount of discharge, and superposes them to be printed on an image by plural numbers of recording scans.

17. An ink jet recording apparatus according to claim 16, wherein said means for discharging are thermal energy transducing elements to generate thermal energy.

18. An ink jet recording apparatus provided with discharging means to discharge ink for the formation of images by discharging ink on a recording medium, comprising:

means for controlling recording capable of recording in a plurality of different pixel densities; and means for controlling superposed printing to arrange ink droplets on one and the same position on the recording medium by separately superposing them in plural numbers, wherein said means for controlling superposed printing separates ink droplets to be recorded on one and the same position of the recording medium in different pixel densities, and superposes them to be printed by plural scans.

19. An ink jet recording apparatus according to claim 18, wherein said means for discharging are thermal energy transducing elements to generate thermal energy.

20. An ink jet recording apparatus having means for controlling recording with respect to at least two kinds of recording densities in high resolution and low resolution, and being capable of forming ink droplets in different sizes on a recording medium corresponding to each of the resolutions, comprising:

controlling means for forming images in low resolution by ink droplets having a comparatively large size with respect to dot lines continuously arranged in horizontal and vertical directions.

21. An ink jet recording apparatus according to claim 20, wherein said controlling means forms images in high resolution by comparatively small dots with the exception of dots for said images in low resolution.

22. An ink jet recording apparatus having means for controlling recording with respect to at least two kinds of recording densities in high resolution and low resolution, and being capable of forming ink droplets in different sizes on a recording medium corresponding to each of the resolutions, comprising:

controlling means for arranging a plurality of comparatively small dots in one pixel of dots formed in low resolution when images are formed in high resolution.

23. An ink jet recording apparatus provided with a recording head for forming images on a recording medium, comprising:

means for controlling a discharging amount to control an amount of ink droplets to be discharged from said recording head;

means for controlling a recording density to control a recording density of dots formed by ink droplets to be discharged from said recording head;

means for controlling recording to form images having a comparatively low density by ink droplets having a comparatively large discharging amount, and comparatively high density images having a comparatively small discharging amount on one and the same area by said means for controlling discharging amount and said means for controlling recording density; and controlling means to control the recording positions of images.

24. An ink jet recording apparatus according to claim 23, wherein said recording head is provided with means for generating thermal energy to apply the thermal energy to ink, and discharges ink by the application of said thermal energy.

25. An ink jet recording method for forming ink images on a recording medium in different resolutions using means for discharging to discharge ink, comprising the step of:

improving image quality in an area of ink images where an image missing, or excessively emphasizing, density is created along changes of different resolutions by changing recording conditions with respect to ink images to be printed.

26. An ink jet recording method according to claim 25, wherein said recording conditions are the conditions whereby to improve the image quality in the white area of an ink image created in the area where ink images in different resolutions are adjacent to each other.

27. An ink jet recording method according to claim 26, wherein said recording conditions are to complement ink images in relatively high resolution with respect to said adjacent area.

28. An ink jet recording method according to claim 26, wherein said recording conditions are the conditions whereby to perform recording by reducing the feeding pitch of a recording medium in accordance with the difference in said ink images in different resolutions.

29. An ink jet recording method according to claim 26, wherein said recording conditions are to replace ink images in relatively low resolution with respect to said adjacent area where ink images are formed in relatively high resolution.

30. An ink jet recording method according to claim 26, wherein said recording conditions are to complement ink images in relatively high resolution with respect to said adjacent area.

31. An ink jet recording method according to claim 26, wherein said recording conditions are to a change dot arrangement in accordance with data when recording is performed by changing data in relatively low resolution to data in relatively high resolution.

32. An ink jet recording method according to claim 25, wherein said recording conditions are to change dot arrangement and execute partial addition and partial removal at the same time in accordance with data when data in relatively low resolution are changed into data in relatively high resolution, and further, recording is performed to enhance density.

33. An ink jet recording apparatus for forming ink images in different resolutions on a recording medium by use of means for discharging to discharge ink, comprising:

means for determining a recording area following a change of different resolutions; and means for improving image quality to improve image quality by changing recording conditions of ink images to be printed in the recording area thus determined.

34. An ink jet recording apparatus according to claim 33, wherein said means for discharging are thermal energy transducing elements to generate thermal energy.

35. An ink jet recording apparatus provided with means for discharging to discharge ink for the formation of images on a recording medium, comprising:

controlling means for changing an amount of ink droplets to be discharged from said means for discharging in accordance with kinds of recording images to be recorded, and for determining whether data of recording images includes image data having a low resolution or image data having a high resolution, and forms images by changing the amount of ink droplets to be discharged; and means for changing printing modes for arranging recording pixels in accordance with the kinds of said recording images; and means for improving image quality for adding or removing recording pixels in a boundary between kinds of recording images in an image mode changing portion.

36. An ink jet recording apparatus according to claim 35, wherein said controlling means determines whether or not recording image is characters, and forms images by changing the amount of ink droplets to be discharged.

37. An ink jet recording apparatus according to claim 35, wherein said controlling means determines whether recording image is black image or color image, and forms imaged by changing the amount of ink droplets to be discharged.

38. An ink jet recording apparatus according to claim 35, wherein said controlling means forms images by changing ink droplets to be discharged according to whether recording data contain data in high resolution changeable to data in low resolution.

39. An ink jet recording apparatus according to claim 35, wherein said controlling means changes the amount of ink droplets to be discharged when the kinds of recording images are changed, and forms images.

40. An ink jet recording apparatus according to claim 35, further comprising means for setting printing modes, wherein said controlling means changes the amount of ink droplets to be discharged in accordance with said printing mode, and forms images.

41. An ink jet recording apparatus according to claim 35, wherein said means for discharging are thermal energy transducing elements to generate thermal energy.

42. An ink jet recording apparatus provided with means for discharging to discharge ink for the formation of images on a recording medium, comprising:

controlling means for changing an amount of ink droplets to be discharged from said means for discharging in accordance with kinds of recording images, and for determining whether data of the recording images includes image data having a low resolution or image data having a high resolution, and forms images by changing the amount of ink droplets to be discharged;

means for changing printing modes serving as a method for arranging recording pixels in accordance with said kinds of recording images; and means for improving image quality to make an arrangement of data to be recorded different from source data in accordance with said printing modes.

43. An ink jet recording apparatus according to claim 42, wherein said controlling means determines whether or not recording image is characters, and forms images by changing the amount of ink droplets to be discharged.

44. An ink jet recording apparatus according to claim 42, wherein said controlling means determines whether recording image is black image or color image, and forms imaged by changing the amount of ink droplets to be discharged.

45. An ink jet recording apparatus according to claim 42, wherein said controlling means forms images by changing ink droplets to be discharged according to whether recording data contain data in high resolution changeable to data in low resolution.

46. An ink jet recording apparatus according to claim 42, wherein said controlling means changes the amount of ink droplets to be discharged when the kinds of recording images are changed, and forms images.

47. An ink jet recording apparatus according to claim 42, further comprising means for setting printing modes, wherein said controlling means changes the amount of ink droplets to be discharged in accordance with said printing mode, and forms images.

48. An ink jet recording apparatus according to claim 45, wherein said means for discharging are thermal energy transducing elements to generate thermal energy.

49. An ink jet recording method for forming ink images in different resolutions on a recording medium by means for discharging to discharge ink, comprising the following steps of:

providing a printing mode for superposing the arrangement of ink droplets on a representation in a first resolution;

changing the recording image data in said first resolution into a second resolution higher than said first resolution so that an arranging amount of ink droplets per unit pixel is made greater when recording in said first resolution; and executing smoothing processing to form an image without executing any superposed arrangement of ink droplets on one and the same position in said second resolution.

50. An ink jet recording method for forming ink images in different resolutions on a recording medium by means for discharging to discharge ink, comprising the following steps of:

providing a printing mode for superposing an arrangement of ink droplets separately in plural numbers on one and the same pixel position where ink droplets of a first size are arranged;

changing recording image data for ink droplets to be recorded in said first size into a second size smaller than said first size so that an arranging amount of ink droplets per unit pixel is made greater when recording in said first size; and executing smoothing processing to form an image without executing any superposed arrangement of ink droplets on one and the same position where ink droplets are arranged in said second size.

51. An ink jet recording method for forming images in different resolutions on a recording medium by means for discharging to discharge ink, comprising the following steps of:

determining a recording area where resolutions are to change;

correcting image data in a boundary portion between different resolutions in said recording area where resolutions are to change; and executing recording in accordance with corrected data.

52. An ink jet recording method according to claim 51, further comprising:

a step for determining conditions to correct image data in the boundary portion between different resolutions in the area where resolutions are to change.

* * * * *

UNITED STATES PATENT AND TRADEMARK OFFICE
CERTIFICATE OF CORRECTION

PATENT NO. : 6,106,093
DATED : August 22, 2000
INVENTOR(S) : Shigeyasu Nagoshi et al.

It is certified that error appears in the above-identified patent and that said Letters Patent is hereby corrected as shown below:

Column 7,
Line 9, "shows" should read -- show --.

Column 18,
Line 46, "small-doted" should read -- small-dotted --.

Column 21,
Line 51, "a" should read -- an --.

Column 26,
Line 9, "exist" should read -- exists --.

Column 30,
Line 41, right margin should be closed up
Line 42, left margin should be closed up.

Column 31,
Line 5, "made" should read -- are --.

Column 32,
Line 54, "an" should read -- An --.

Column 35,
Line 44, "imaged" should read -- images --.

Column 36,
Line 21, "imaged" should read -- images --
Line 37, "claim 45," should read -- claim 42, --.

Signed and Sealed this

Twenty-third Day of October, 2001

*Attest:*

NICHOLAS P. GODICI
*Attesting Officer*    *Acting Director of the United States Patent and Trademark Office*